(12) United States Patent
Berndsen et al.

(10) Patent No.: US 7,645,851 B2
(45) Date of Patent: Jan. 12, 2010

(54) POLYCARBONATE WITH REDUCED COLOR

(75) Inventors: Sjef Berndsen, Rilland (NL); Hans Peter Brack, Herrliberg (CH); Bernd Jansen, Bergen Op Zoom (NL); Edward Kung, Bergen op Zoom (NL); Daniel Lowery, Schenectady, NY (US); Patrick Joseph McCloskey, Watervliet, NY (US); Dennis Karlik, Bergen op Zoom (NL); Gerardo Hidalgo Llinas, Cartagena (ES)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 308 days.

(21) Appl. No.: 11/688,551

(22) Filed: Mar. 20, 2007

(65) Prior Publication Data

US 2008/0004379 A1   Jan. 3, 2008

Related U.S. Application Data

(60) Provisional application No. 60/806,304, filed on Jun. 30, 2006.

(51) Int. Cl.
*C08G 64/00* (2006.01)
*C08G 63/18* (2006.01)

(52) U.S. Cl. ............ 528/198; 422/131; 422/135; 524/115; 524/130; 524/133; 528/196; 528/425

(58) Field of Classification Search ............ 422/131, 422/135; 524/115, 130, 133; 528/196, 198, 528/425
See application file for complete search history.

(56) References Cited

U.S. PATENT DOCUMENTS

| | | | |
|---|---|---|---|
| 4,323,668 A | 4/1982 | Brunelle | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,790,929 B2 | 9/2004 | Silvi et al. | |
| 6,870,025 B2 | 3/2005 | McCloskey et al. | |
| 7,034,099 B2 | 4/2006 | Kamps et al. | |
| 2002/0115759 A1 | 8/2002 | Eckel et al. | |
| 2002/0132957 A1 | 9/2002 | Brack et al. | |
| 2003/0139529 A1 | 7/2003 | O'Neil et al. | |
| 2003/0149223 A1 | 8/2003 | McCloskey et al. | |
| 2003/0208027 A1* | 11/2003 | Brack et al. ............ | 528/196 |
| 2003/0236384 A1* | 12/2003 | Silvi et al. ............ | 528/86 |
| 2004/0068086 A1 | 4/2004 | Day et al. | |
| 2004/0087756 A1 | 5/2004 | Ramesh et al. | |
| 2004/0138383 A1 | 7/2004 | O'Neil et al. | |
| 2005/0171322 A1 | 8/2005 | Kamps et al. | |
| 2005/0234211 A1 | 10/2005 | Martinez et al. | |
| 2005/0250930 A1* | 11/2005 | Ikeda et al. ............ | 528/196 |
| 2006/0025622 A1 | 2/2006 | Buckley et al. | |
| 2006/0069228 A1 | 3/2006 | McCloskey et al. | |
| 2006/0135662 A1* | 6/2006 | Mullen ............ | 524/157 |
| 2008/0004417 A1 | 1/2008 | Jansen et al. | |
| 2008/0004418 A1 | 1/2008 | Jansen et al. | |

FOREIGN PATENT DOCUMENTS

| | | |
|---|---|---|
| JP | 5009282 | 1/1993 |
| JP | 10101786 | 4/1998 |
| JP | 10101787 | 4/1998 |
| JP | 11302228 | 11/1999 |
| JP | 2000129112 | 5/2000 |
| JP | 2002309015 | 10/2002 |
| WO | 02059207 A2 | 8/2002 |
| WO | 03040208 | 5/2003 |
| WO | 03106149 | 12/2003 |
| WO | 2004060962 A1 | 7/2004 |

* cited by examiner

*Primary Examiner*—Terressa M Boykin
(74) *Attorney, Agent, or Firm*—Larson & Anderson, LLC

(57) ABSTRACT

A method of making polycarbonate includes the steps of forming polycarbonate by a melt transesterification method using an activated diaryl carbonate, and compounding the polycarbonate with a phosphorus-containing compound that has an abstractable proton or hydrolyzable group. The phosphorus-containing compound is compounded with the polycarbonate in an amount sufficient to result in an improvement in the color properties of the polycarbonate as compared to pellets formed from the same polycarbonate without addition of the phosphorus-containing compound.

61 Claims, 3 Drawing Sheets

BPA ("uncapped"/free OH)

POLYCARBONATE WITH REDUCED COLOR

CROSS REFERENCE TO RELATED APPLICATIONS

The present application claims priority to and is a non-provisional application of U.S. provisional application Ser. No. 60/806,304 filed on Jun. 30, 2006 which is herein incorporated for all purposes by reference.

BACKGROUND OF THE INVENTION

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or by (2) a melt polymerization process in which BPA is transesterified with a diaryl carbonate such as diphenyl carbonate (DPC) or an activated diaryl carbonate such as bismethylsalicylcarbonate (BMSC). For many applications, there has been a need for materials possessing the fundamental characteristics of transparency and toughness inherent in BPA polycarbonate but possessing, in addition, certain improvements in physical properties relative to those possessed by bisphenol A polycarbonate (BPA-PC), for example birefringence. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

Color can be generated in polycarbonates or in copolycarbonates which reduces the transparent quality of resulting articles formed from such. The quality of the starting materials has a large effect on the color of the final polycarbonate. Further, the polymerization and molding conditions used to produce the polycarbonate and molded articles may lead to the formation of side reactions within the polycarbonate leading to color formation therein. It would be beneficial to find a way to improve the color of polycarbonates.

SUMMARY OF THE INVENTION

The present invention provides a method of improving the color properties of compounded polycarbonate pellets that is applicable to polycarbonates formed in a melt transesterification process using an activated diaryl carbonate, particularly a salicyl carbonate. In one embodiment the present invention provides a method of making a polycarbonate of improved color, comprising the steps of:

(a) forming polycarbonate by a melt transesterification method using an activated diaryl carbonate, (b) compounding the polycarbonate with a phosphorus-containing compound that has an abstractable proton or hydrolyzable phosphate ester group, wherein the phosphorus-containing compound is compounded with the polycarbonate in an amount sufficient to result in an improvement in the color properties of the polycarbonate as compared to pellets formed from the same polycarbonate without addition of the phosphorus-containing compound.

While manufacture of polycarbonate using activated diaryl carbonates offers many benefits, one of the downsides of the approach is the formation of product with greater color than a comparable product made using diphenyl carbonate. The method of the present invention can actually improve the color of the polycarbonate product, for example being able to take terpolymer pellets from a rusty brown color to nearly water-white transparent upon compounding. As demonstrated below, this occurs using phosphorus compounds that have abstractable protons (essentially independent of the pKa of the proton) or phosphates with hydrolyzable groups such as ester, anhydride, amide or halogen groups, but does not occur with acids lacking the phosphorus group or phosphorus compounds lacking the abstractable proton or hydrolyzable phosphate functionality. The improvement is most pronounced when the color of the polycarbonate is poor at the outset, for example in terpolymer samples, but is observable even with high quality homopolymer samples. On the other hand, the improvement is not observed when polycarbonate made using non-activated diphenyl carbonate is compounded with the same types of phosphorus-containing compounds.

The method of the present invention is particularly useful in providing quinone-containing polycarbonate made using an activated diaryl carbonate (and thus containing internal ester linkages) having superior color properties as reflected in an L* value of greater than 85. Thus, the present application further provides a polycarbonate composition, characterized in that the polycarbonate contains quinone residues, internal ester linkages derived form the activated diaryl carbonate and at least ppb levels of phosphorus, and an L value of greater than 85.

In a further embodiment the present invention provides a method of making a stabilized polycarbonate blend, as well as a stabilized polycarbonate blend. A first blend comprises (a) a melt polycarbonate comprising a residue from a quinone-type monomer, (b) UV stabilizer having a free —OH group, and (c) a phosphorus-containing compound having an abstractable proton or hydrolyzable group, wherein the phosphorous-containing compound is present in the blend in an amount sufficient to result in an improvement in the melt stability properties of the blend as compared to a blend formed from the same polycarbonate and UV stabilizer without the addition of the phosphorus-containing compound. A second blend comprises (a) a melt polycarbonate comprising a residue from an activated diaryl carbonate, (b) UV stabilizer having a free —OH group, and (c) a phosphorus-containing compound having an abstractable proton or hydrolyzable group, wherein the phosphorous-containing compound is present in the blend in an amount sufficient to result in an improvement in the melt stability properties of the blend as compared to a blend formed from the same polycarbonate and UV stabilizer without the addition of the phosphorus-containing compound.

DETAILED DESCRIPTION OF THE INVENTION

The present invention may be understood more readily by reference to the following detailed description of preferred embodiments of the invention and the examples included herein. The present invention provides a method of improving the color of polycarbonate produced by the melt transesterification method using an ester-substituted diaryl carbonate as a carbonate source. It has herein been found that compounding certain types of phosphorus-containing compounds with polycarbonate produced by the melt transesterification reaction using an activated diaryl carbonate as a carbonate source, results in improved color of the polycarbonate compared to polycarbonate prepared by the melt reaction with an ester-substituted diaryl carbonate without the addition of the phosphorus-containing compound.

DEFINITIONS

As used in the specification and claims of this application, the following definitions, should be applied:

"a", "an", and "the" as an antecedent refer to either the singular or plural. For example, "an aromatic dihydroxy compound" refers to either a single species of compound or a mixture of such species unless the context indicates otherwise.

As used herein the term "Fries product" or "Fries rearrangement product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A species upon complete hydrolysis of the product polycarbonate.

The terms "Fries reaction" and "Fries rearrangement" are used interchangeably herein.

Figure 1A:
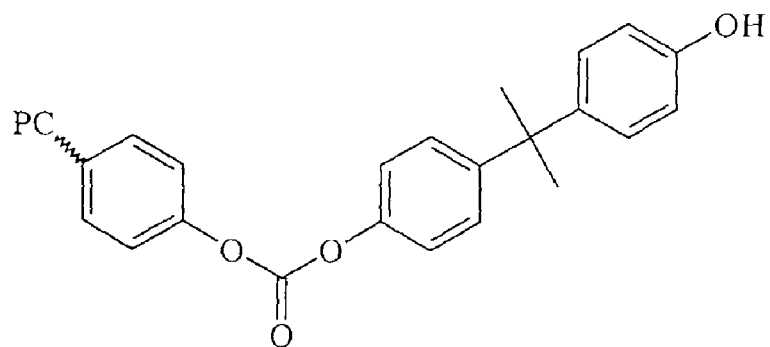
FIG. 1A-F shows various types of end groups that can form when polycarbonate (PC) is formed using bisphenol A and an activated carbonate.
Figure 1B:
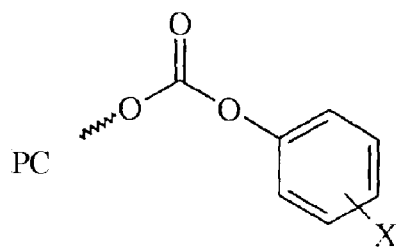
Figure 1C:
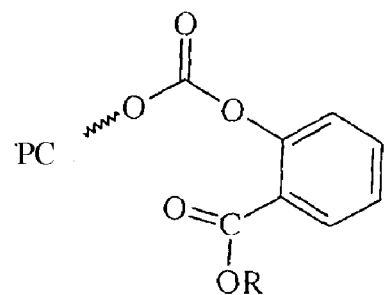
Figure 1D:
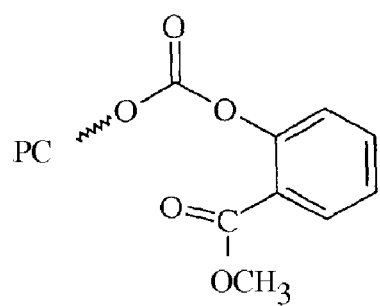
Figure 1E:
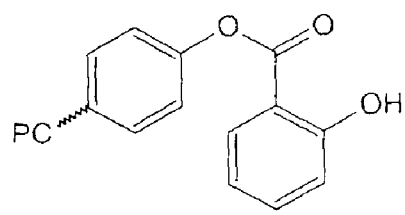
Figure 1F:
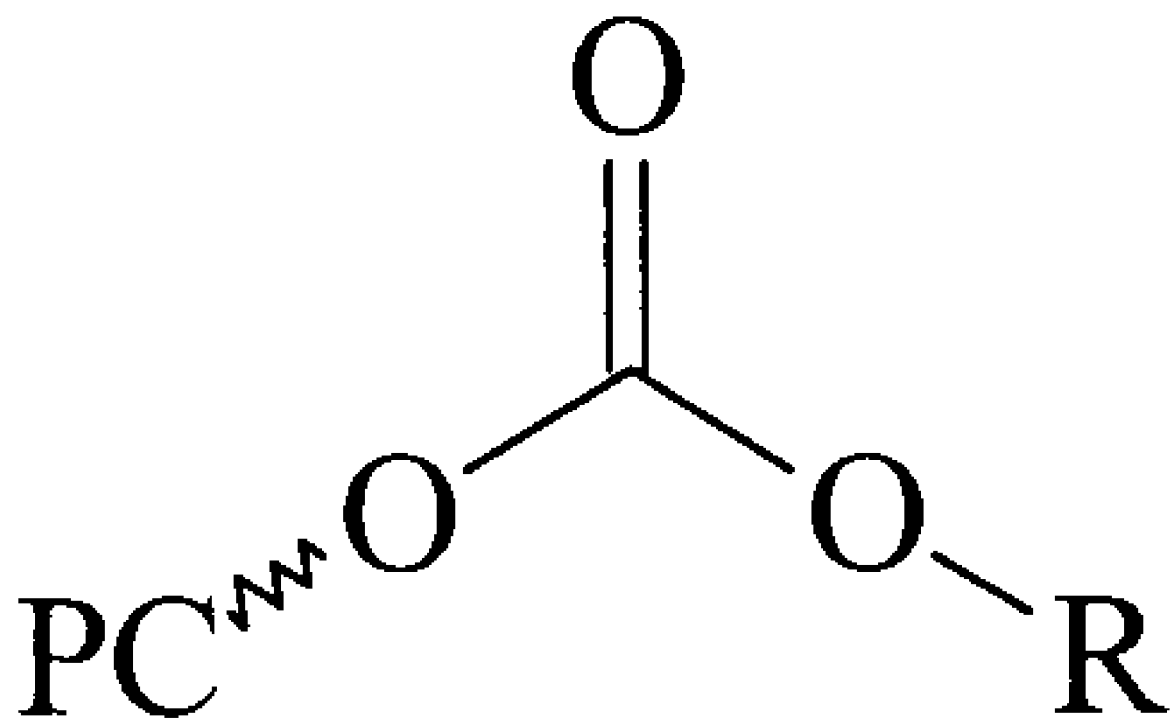

"residue from an activated diaryl carbonate" refers to linkages within the polycarbonate or end groups that are formed during the reaction of a dihydroxy compound and specifically an activated diaryl carbonate such as BMSC rather than a non activated diaryl carbonate such as DPC. An internal ester linkage (IEL) is a typical example of such a residue from an activated carbonate. In addition to an IEL FIGS. 1A-1F shows examples of some of the other types of groups (i.e. residues) that can form when polycarbonate (PC) is formed using bisphenol A and an activated ester-substituted diaryl carbonyl such as BMSC. FIG. 1A shows a portion of a BPA polycarbonate, with an internal carbonate linkage and a free OH end group. The carbonate linkage can be formed from either an activated or non activated diaryl carbonate. PC represents the balance of the polycarbonate chain. FIG. 1B shows a generalized structure of an activated carbonate end group in which X is one or more electron-withdrawing substituents at the ortho and para positions. FIG. 1C shows the structure of salicyl carbonate end group, where R is an alkyl (for example methyl, ethyl, propyl, butyl or pentyl), phenyl or benzyl group. FIG. 1D shows a methyl salicyl carbonate end group (T-MSC). FIG. 1E shows a salicyl-OH (sal-OH) end group. FIG. 1F shows a non-activated carbonate end group in which R is defined as in FIG. 1C. For example, such end groups may be formed from the transesterification reaction to incorporate the alcoholic byproduct (e.g. methanol) formed from the hydrolysis or transesterification reaction of the salicyl ester of an activated carbonate (e.g. BMSC or T-MSC). These residues are further described in U.S. provisional patent application Ser. No. 60/806,312 filed on Jun. 30, 2006 which is herein incorporated for all purposes by reference.

"internal ester linkage" or "IEL" refers to a linkage derived from an ester-substituted diaryl carbonate (i.e. an activated diaryl carbonate) that is formed internally in place of the normal carbonate linkage. The IEL is sometimes referred to as "internal salicyl carbonate" or "ISC" and has the structure:

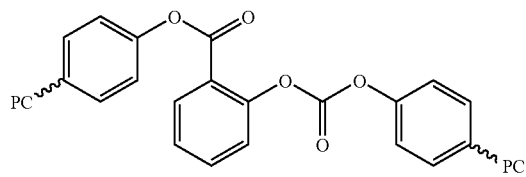

"polycarbonate" refers to an oligomer or polymer comprising residues of at least one dihydroxy compound joined by carbonate linkages. In certain embodiments of the invention, the polycarbonate comprises residues of an aromatic dihydroxy compound and has a number average molecular weight, Mn measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

Materials:

The Phosphorus-Containing Compound (PCC):

The phosphorus-containing compound ("the PCC") used in the present application is one that has at least one abstractable proton or a hydrolyzable group, such as an ester, anhydride, amide or halide. The importance of the PCC having these characteristics is demonstrated in the examples set forth below. In these examples, $H_3PO_3$, $Zn(H_2PO_4)_2$ and $(NH_4)_2HPO_4$ where the phosphorous has at least one abstractable proton, and distearyl pentaerythritol diphosphite where the phosphorus has a hydrolyzable group are shown to be effective for improving the color of the polycarbonate while non-phosphorous containing acids and phosphorous compounds with no abstractable proton or hydrolyzable group are shown not to be effective.

In accordance with an embodiment of the present invention, a PCC suitable for use with the present invention has the general structure:

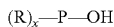

wherein each substituent R is independently selected from the group consisting of (=O); hydrogen; $N(R_1)_4^+$ $^-O$—; $M^+$ -O—; $M^{+2}$ ($^-O$—)$_2$; OH; linear, branched or cyclic $C_1$-$C_{36}$ alkyl or alkoxy; optionally substituted phenyl, aryl, phenoxy, or aryloxy; linear, branched or cyclic alkyl or optionally-substituted aryl or alkaryl phosphate ester or acid; and linear, branched or cyclic alkyl or optionally-substituted aryl or aralkyl phosphite ester or acid;

x is an integer between 1 and 3, wherein at most only one substituent may be (=O);

wherein $M^+$ may be a monovalent metal ion or fragment of a metal ion complex or salt and $M^{+2}$ may be a divalent metal ion or fragment of a metal ion complex or salt, and wherein the sum of all integers x is equal to 3 if the substituent (=O) is present and equal to 2 if the substituent (=O) is absent.

In preferred embodiments, the acidic PCC has the more specific structure of either of structures I to II. In one embodiment the PCC will have structure I:

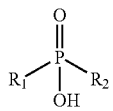

wherein $R_1$ and $R_2$ are independently hydrogen; O—(NH$_4$)+; OH; linear, branched or cyclic $C_1$-$C_{36}$ alkyl or alkoxy; optionally substituted phenyl, aryl, phenoxy, or aryloxy.

In another preferred embodiment the acidic PCC will have structure II:

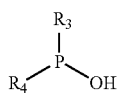

wherein $R_3$ and $R_4$ are independently hydrogen; O—(NH$_4$)+; OH; linear, branched or cyclic $C_1$-$C_{36}$ alkyl or alkoxy; optionally substituted phenyl, aryl, phenoxy, or aryloxy.

A non-limiting list of preferred PCCs having structure I or II that are suitable for use with the present invention are: dimethyl phosphinic acid (CAS #3283-12-3), dibutyl phosphinic acid, diphenyl phosphinic acid (CAS #1707-03-5), 2-methylphenyl(phenyl)phosphinic acid, 3,5-dimethylphenyl(phenyl)phosphinic acid (CAS#96331-30-5), 3-methoxyphenyl(phenyl)phosphinic acid (CAS #4552-91-4), 4-methoxyphenyl(phenyl)phosphinic acid (CAS #13118-95-1), 1-methylheptyl(phenyl)phosphinic acid (CAS #64308-50-5), 4-ethoxyphenyl(phenyl)phosphinic acid (CAS #96329-70-3), bis(4-methoxyphenyl)phosphinic acid (CAS #20434-05-3), dioctylphosphinic acid, bis(2,4,4-trimethylpentyl) phosphinic acid (CAS #27661-42-3), diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate (CAS #39648-67-4), and di(2-ethylhexyl) phosphate, mono-zinc phosphate Zn(H$_2$PO$_4$)$_2$, phosphoric acid and phosphorus acid.

Without intending to be bound by any particular mechanism, the inventors believe that the acidic functionality of the PCC may be quite important in its color-improving function. One skilled in the art will understand that it may not be readily possible to use acidic additives in all additive feeding, mixing, reacting, and extruding systems due to insufficient corrosion resistance of the construction materials of the system depending on the acidity of the PCC and its residence time and temperature in the system components and also the choice of optional solvent systems for the PCC. The occurrence of such corrosion processes may actually act to degrade the color of the polycarbonate rather than to improve it. For this reason, it may be desirable to use a PCC having a hydrolyzable group such as a phosphorus ester, anhydride, amide, or halide. In one embodiment it is a phosphorus ester. The choice of the PCC and its hydrolyzable group will depend on the residence time and temperature and other conditions such as the use of an optional solvent for the color improvement process. It is believed that the hydrolyzable group should ideally undergo significant hydrolysis to yield appreciable quantities of an active acidic species for sufficient time in the color improvement process.

Thus, in another embodiment the PCC may be a non-sterically-hindered and hydrolyzable phosphite or phosphate esters, amides, and anhydrides. Without being bound by a mode of operation, it is believed that non-sterically hindered and hydrolyzable phosphite and phosphate esters and the like readily hydrolyze to form acidic species under molding conditions and pellet forming conditions at the high temperatures. In preferred embodiments these esters have no branching near the ester group (O or OR$^1$) so that there is little to no inhibition of the hydrolysis/degradation of this ester under molding or pellet forming conditions.

In general these non-sterically-hindered and hydrolyzable phosphite or phosphate esters will have the general structure:

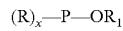

wherein each substituent R is independently selected from the group consisting of (=O); hydrogen; $N(R_1)_4^+$ $^-O$—; $M^+$ -O—; $M^{+2}$(O—)$_2$; OH; linear or cyclic $C_1$-$C_{36}$ alkyl or alkoxy; optionally non-ortho-substituted phenyl, aryl, phenoxy, or aryloxy; linear, branched or cyclic alkyl or optionally-substituted aryl or alkaryl phosphate ester or acid; and linear, branched or cyclic alkyl or optionally-substituted aryl or aralkyl phosphite ester or acid;

x is an integer between 1 and 3, wherein at most only one substituent may be (=O);

wherein $M^+$ may be a monovalent metal ion or fragment of a metal ion complex or salt and $M^{+2}$ may be a divalent metal ion or fragment of a metal ion complex or salt, and wherein the sum of all integers x is equal to 3 if the substituent (=O) is present and equal to 2 if the substituent (=O) is absent.

The $R_1$ group can be a linear, branched or cyclic $C_1$-$C_{36}$ alkyl, optionally non-ortho-substituted phenyl, aryl, aralkyl. If the alkyl is branched, the branch point should be located at least 2 carbons away from the oxygen, preferably 3 or more, most preferably 4 or more. Any branch lengths should be less than x−1 carbons long, where x is the number of carbons between the branch point and the oxygen. Preferably any branches will be short and comprise not more than 1-3 carbon atoms.

In preferred embodiments, these non-sterically hindered ester PCCs have the more specific structure of either of structures III to IV described below.

In one embodiment, the non-sterically hindered ester PCC has the more specific structure III:

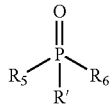

wherein R' is an alkoxyl, phenoxy, aryloxy or aralkyloxy, $NR_x$ (where $R_x$ is H, alkyl, aryl or aralkyl), $OC(=O)R_x$ or $OP(=O)R_x$, and $R_5$ and $R_6$ are independently hydrogen, hydroxy; linear or cyclic $C_1$-$C_{36}$ alkyl or alkoxy; phenyl, aryl, phenoxy, or aryloxy phosphate ester or acid and phosphite ester or acid.

In another embodiment the non-sterically hindered ester PCC has the more specific structure IV:

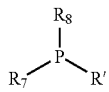

wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; linear or cyclic $C_1$-$C_{36}$ alkyl or alkoxy; phenyl, aryl, phenoxy, or aryloxy, phosphate ester or acid, and phosphite ester or acid.

A non-limiting list of PCCs having structure III or IV that are suitable for use with the present invention are: distearyl pentaerythritol diphosphite, n-butyl diphenylphosphinite (CAS#13360-94-6), 2-phenylethyl diphenylphosphinate, 1-naphthyl diphenylphosphinate, methyl diphenylphosphinite (CAS #4020-99-9), ethyl diphenylphosphinite (CAS #719-80-2), n-butyl diphenylphosphinite (CAS #13360-94-6), methylcyclohexyl diphenylphosphinate, triphenyl phosphite, diisodecyl phenyl phosphite, tri-para-tolyl phosphate, tri-n-propyl phosphate (CAS#513-02-0), methyl diphenyl phosphate (CAS #115-89-9), tri-n-butyl phosphate (CAS #126-73-8), triphenyl phosphate (CAS #115-86-6), cyclohexyl diphenyl phosphate (CAS #4281-67-8), bis(3,5-dimethylphenyl) 4-ethylphenyl phosphate (CAS #7144-07-2), tris(3,4-dimethylphenyl) phosphate (CAS #3862-11-1), tris (4-tert-butylphenyl) phosphate (CAS #78-33-1), trans-1,4-cyclohexanediol bis(diphenyl phosphate), trisnonylphenyl phosphate, triisodecyl phosphite, tris(tridecyl) phosphate, and trilauryl phosphite.

A non-limiting list of anhydride PCCs having structure III or IV that are suitable for use with the present invention are: phosphorus anhydride compounds include phosphorus pentoxide ($P_4O_{10}$, CAS #1314-56-3), pyrophosphoric acid ($H_4O_7P_2$, CAS #2466-09-3), magnesium pyrophosphate ($H_4MgO_7P_2$, CAS #13446-24-7), dimethyl acid pyrophosphate ($C_2H_8O_7P_2$, CAS#26644-00-8), diethyl acid pyrophosphate ($C_4H_{12}O_7P_2$, CAS #1707-71-7), potassium pyrophosphate ($H_4KO_7P_2$, CAS #7320-34-5), tetraethyl diphosphate ($C_8H_{20}O_7P_2$, CAS#107-49-3), and propylphosphonic anhydride ($C_9H_{21}O_6P_3$, CAS #68957-94-8).

A non-limiting list of amide PCCs having structure III or IV that are suitable for use with the present invention are: tris(N,N-tetramethylene)phosphoric acid triamide ($C_{12}H_{24}N_3OP$, CAS #6415-07-2), methylphosphonic bis (dimethylamide) ($C_5H_{15}N_2OP$, CAS #2511-17-3), N,N,N',N'-tetramethylphosphorodiamidic chloride ($C_4H_{12}ClN_2OP$, CAS#1605-65-8), hexamethylphosphoramide ($C_6H_{18}N_3OP$, CAS #680-31-9), 1,3-dimethyl-1,2,3,4-tetrahydro-1,3,2-benzodiazaphosphorine-2,4-dione ($C_9H_{11}N_2O_2P$, CAS #68614-93-7), diphenyl 1-piperidinylphosphonate ($C_{17}H_{20}NO_3P$), phenyl N,N,N',N'-tetramethyldiamidophosphate ($C_{10}H_{17}N_2O_2P$), and N,N,N',N'-tetramethyl-P-phenylphosphonic diamide ($C_{10}H_{17}N_2OP$).

In further specific embodiments the PCC will have two or more phosphorus atoms within the molecule. For example a particularly preferred PCC that has structure IV is distearyl pentaerythritol diphosphite, for example WESTON® 618 which is a compound having the structure:

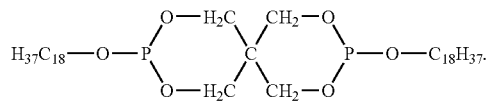

The Polycarbonate:

In one embodiment the present invention is useful for reducing the color of polycarbonate made by melt transesterificaction of a dihydroxy compound with an activated diaryl carbonate, i.e. an ester-substituted diaryl carbonate, is used as a carbonate source. Such an ester-substituted diaryl carbonate will preferably have the structure:

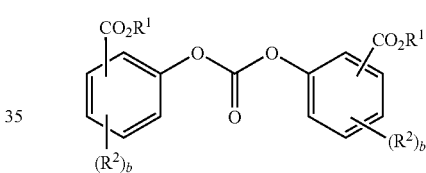

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from 0 to 4. At least one of the substituents $CO_2R^1$ is preferably attached in an ortho position relative to the carbonate group.

Examples of ester-substituted diarylcarbonates include but are not limited to bismethylsalicylcarbonate (CAS No. 82091-12-1), bisethylsalicylcarbonate, bispropyl salicylcarbonate, bisbutylsalicylcarbonate, bisbenzylsalicylcarbonate, bismethyl 4-chlorosalicylcarbonate and the like. Typically bismethylsalicylcarbonate is preferred for use in melt polycarbonate synthesis due to its preparation from less expensive raw materials, lower molecular weight and higher vapor pressure.

The nature of the dihydroxy compound is not critical. The dihydroxy compound may be any of the various dihydroxy compounds known in the art. The polycarbonate may be a homopolymer containing residues of only one type of dihydroxy compound or it may contain residues of two or more types of dihydroxy compound. In the examples below, a terpolymer is exemplified. Specific non-limiting examples of suitable dihydroxy compounds include bisphenol A, hydroquinone, methyl hydroquinone, and other monomers as set forth in filed U.S. application Ser. Nos. 11/427,861 and 11/427,885 which are incorporated herein by reference.

A downside of using activated diaryl carbonates in the preparation of polycarbonates by melt transesterification can be the formation of products with greater color. This can result from the formation of specific internal linkage having structure (a)

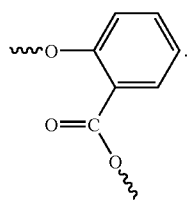

In the case of the present invention, however, there is apparently some other unidentified source of color in polycarbonates made using activated diaryl carbonate, since color is improved by the addition of the PCC, without any significant change in the amount of internal salicyl linkages (a).

The Process:

It has also been herein found that the addition of the PCC compound to polycarbonate pellets has the effect of reducing the color of the pellets. It is not understood why the addition of the PCC to polycarbonate prior to molding has the effect of reducing its color since it does not have a measurable effect on the IEL linkage content of the pellet. However, when the PCC is added to the polycarbonate it has the effect of improving the color of such. Hence, in another embodiment of the present invention a method for making polycarbonate pellets comprises the steps of:

(a) forming polycarbonate by a melt transesterification method using an activated diaryl carbonate, (b) compounding the polycarbonate with a phosphorus-containing compound that has an abstractable proton or hydrolyzable ester group, wherein the phosphorus-containing compound is compounded with the polycarbonate in an amount sufficient to result in an improvement in the color properties of the polycarbonate as compared to polycarbonate formed from the same polycarbonate without addition of the phosphorus-containing compound.

Several methods are known for producing polycarbonate using an ester-substituted diaryl carbonate as a carbonate source in the melt transesterification reaction. Processes described in U.S. applications Ser. Nos. 11/427,861 and 11/427,885 are preferred, and are herein incorporated by reference for all purposes.

As used in the specification and claims herein the term "compounding" refers to the intimate mixing of the polycarbonate and the PCC prior to preparation of a final product or article. Compounding is commonly done by combining previously prepared polycarbonate pellets with the PCC and passing the mixture through an extruder to produce compounded-pellets that can then be further processed, for example into shaped articles. Addition of the PCC in the final step of initial pelletizing can also be done, however, if this is desired.

The color improvement process of the invention can be done in either a melt or in solution. In the melt, the PC and PCC can be melt mixed or kneaded together in an extruder, melt kneader, reactor or other system or device capable of melting and mixing the polycarbonate and the PCC followed by its extrusion or pelletization or direct melt processing into shaped articles. For solution processing the PC and PCC are combined in an inert solvent and maintained together for sufficient reaction time and temperature to reduce the color. After the color improvement process, the solvent is removed, for example using vacuum, to very low levels in order to have a useful polycarbonate.

The temperature of the extruder is not critical, and will generally be the conventional extruder temperature used for forming pellets of a particular polycarbonate. The appropriate extruder temperature will depend on the properties of both the polycarbonate and the PCC. Higher molecular weight polycarbonates and/or high heat ones containing monomer units that increase the polymer Tg will typically require higher extruder temperatures so that the melt viscosity is low enough for sufficient mixing with the PCC to occur. More thermally stable hydrolyzable PCCs may require high temperatures to generate their active form. On the other hand too high extruder temperatures may result in thermal degradation and discoloration of the polycarbonate or devolatization or excessive degradation of the PCC before sufficient color improvement has occurred. Suitable temperature ranges include 275 to 375° C., in one embodiment between 290 to 350° C., and in another embodiment between 300 and 340° C. One skilled in the art will understand that the temperature of the polymer melt may vary somewhat from the extruder temperature depending on the occurrence of exothermic and/or endothermic reactions and processes and any heat generated by the mechanical mixing the molten polymer.

The amount of PCC compounded with the polycarbonate is an amount sufficient to result in the desired degree of color improvement. The PCC is suitably added in amounts of at least 1 ppm, preferably at least 5 ppm, and most preferably at least 9 ppm. The amount of PCC may also be determined based on the molar ratio of P (from PCC/catalyst, and also referred to as P/catalyst and P/cat ratio) since it may be necessary to add more on a mass basis of a higher Mw PCC or add less on a mass basis of a di-functional PCC. Also if higher basic catalyst levels are used, it may be necessary to use higher amounts of the PCC on a mass basis. Thus, in accordance with some embodiments of the invention the P/cat molar ratio is suitably greater than 1, preferably more than 1.1, and more preferably more than 1.5. On the other hand, if the P/cat ratio is too high, the color may be improved but the polycarbonate may be thermally unstable (Mw) etc. due to acid-induced hydrolysis reactions. Accordingly, the ratio should generally be less than 100, preferably less than 20, more preferably less than 10, and most preferably less than 5. In calculating the P/cat ratio, the catalyst that is taken into account is any alpha (inorganic) catalyst that is used, since this does not degrade or devolatize and is thus significant in determining the optimum P/cat ratio.

The optimum P/catalyst molar ratio will depend somewhat on the properties of the PCC. If the PCC has a high volatility, does not readily hydrolyze to yield an abstractable proton, has a less active abstractable proton, or is readily degraded to a non-active form, higher amounts of PCC and thus P maybe required. On the other hand, if the PCC has more than one abstractable proton and/or more than one active phosphorus functionality or if the abstractable proton is very active, lower molar ratios of P/catalyst may be used. The compounding may be performed under reduced pressure, which will tend to assist in removal of salicylate by-products. Suitable reduced pressures are in the range of 50 to 350 mbar, for example 50 to 200 mbar.

PC/UV stabilizer/PCC Blends:

In another embodiment of the present invention the phosphorus-containing compound described above has also proven useful in polycarbonate blends comprising an UV absorber. As demonstrated in the II. PCC Addition Improves UV Retention in PC/UV absorber blends section of the Examples below, there is a need for stabilization of melt polymers having UV absorbers (having a free OH group which adds to the effectiveness of the UV stabilizer). The melt polymer may be: (1) a polymer prepared in a melt transesterification reaction using an activated (such as BMSC) or non-activated diaryl carbonate (such as DPC) as the carbonate source in combination with a quinone-type monomer source; (2) polymers prepared in a melt transesterification reaction using an activated diaryl carbonate (such as BMSC) as the carbonate source with or without the use of a quinone-type monomer; or (3) a combination of (1) and (2). In accordance with the present embodiment, the stabilization occurs with PCC compounds as described above such as with $H_3PO_3$. Without stabilization of the polymer with the PCC, it is believed that the free —OH groups of the UV absorber will react with the polymer backbone leading to molecular weight loss.

In a first example, the polycarbonate used for the blend is a terpolymer (i.e. a polymer having a backbone derived from a monomer source comprising a quinone-type monomer) produced by the melt polymerization process. The quinone-type monomer is not particularly limited. Suitable monomers having quinone-type structures are illustrated by the following non-limiting list: hydroquinone, methylhydroquinone, butylhydroquinone, and phenylhydroquinone. The carbonate source for this melt polymerization reaction can be derived from either a diaryl carbonate such as DPC and/or from an activated diaryl carbonate as described above such as BMSC. The polycarbonate of the first example will have residues of a quinone-type monomer incorporated within the polymer chain.

In a second example, the polycarbonate used for the blend is a homopolymer or copolymer containing no quinone-type monomer and is produced by a melt polymerization process using an activated diaryl carbonate (e.g. BMSC) as the carbonate source. The polycarbonate of this second example will have residues of an activated diaryl carbonate as described above (e.g. an IEL, T-MSC, and/or salicyl-OH) incorporated within the polymer chain.

Thus the present inventions provides methods for producing stabilized polycarbonate blends. In a first embodiment a method of forming a stabilized polycarbonate blend includes the steps of:
(a) forming polycarbonate by a melt transesterification method using a diaryl carbonate and a quinone-type monomer, and
(b) compounding the polycarbonate with a phosphorus-containing compound and a UV stabilizer having a free —OH group, thereby forming a blend,
wherein the phosphorus-containing compound has an abstractable proton or hydrolyzable group, and
wherein the phosphorus-containing compound is compounded with the UV stabilizer and the polycarbonate in an amount sufficient to result in an improvement in the melt stability properties of the blend as compared to a blend formed from the same polycarbonate and UV stabilizer without the addition of the phosphorus-containing compound.

In a second embodiment a method of forming a polycarbonate blend includes the steps of:
(a) forming polycarbonate by a melt transesterification method using a activated diaryl carbonate, and
(b) compounding the polycarbonate with a phosphorus-containing compound and a UV stabilizer having a free —OH group, thereby forming a blend,
wherein the phosphorus-containing compound has an abstractable proton or hydrolyzable group, and
wherein the phosphorus-containing compound is compounded with the UV stabilizer and the polycarbonate in an amount sufficient to result in an improvement in the melt stability properties of the blend as compared to a blend formed from the same polycarbonate and UV stabilizer without the addition of the phosphorus-containing compound.

The amount of phosphorus containing compound compounded with the polycarbonate and the UV stabilizer is preferably in an amount sufficient to provide a molar ratio of (phosphorus atoms/transesterification catalyst used in forming the polycarbonate) of between 1:1 and 10:1 and more preferably a molar ratio is between 5:1 and 10:1.

These methods produce stabilized polycarbonate blends. A first stabilized blend comprises:
(a) a melt polycarbonate comprising a residue from a quinone-type monomer,
(b) a UV stabilizer having a free —OH group, and
(c) a phosphorus-containing compound having an abstractable proton or hydrolyzable group,
wherein the phosphorus-containing compound is present in the blend in an amount sufficient to result in an improvement in the melt stability properties of the blend as compared to a blend formed from the same polycarbonate and UV stabilizer without the addition of the phosphorus-containing compound.

A second stabilized polycarbonate blend comprises:
(a) a melt polycarbonate comprising a residue from an activated diaryl carbonate,
(b) a UV stabilizer having a free —OH group, and
(c) a phosphorus-containing compound having an abstractable proton or hydrolyzable group,
wherein the phosphorus-containing compound is present in the blend in an amount sufficient to result in an improvement in the melt stability properties of the blend as compared to a blend formed from the same polycarbonate and UV stabilizer without the addition of the phosphorus-containing compound.

EXAMPLES

In the following examples, the indicated polycarbonates prepared using BMSC as the activated diaryl carbonate were compounded on a Werner & Pfleiderer ZSK25 twin-screw extruder. The PCC additive was manually premixed with polycarbonate resin powder and further homogenized with a shaking device. This premix was then fed to the extruder with the indicated polycarbonate in a 1:19 ratio. The barrel temperature of the extruder was set at 300° C. while a vacuum in the range of 150-350 mbar was applied. Extruded polymer strands were briefly cooled by passing through a water bath and finally pelletized for analysis.

I: PCC Addition Improves Pellet Color:

Working Examples (WEs 1-19) and Comparative Examples (CEs 1-18) give a comparison between the color properties of resin pellets prepared from melt polycarbonates synthesized using diphenyl carbonate (DPC polycarbonate) and ester-substituted activated carbonates (such as BMSC polycarbonate) that are compounded with various acid or ester additives. The properties that vary in these compounded resin pellets are the type and content of the additive used in the compounding step along with the type of carbonate source used to prepare the polycarbonate. For example, the additives may be acids, esters or salts. Some of these compounds have such functional groups that are primarily carbon-based ones, whereas others are sulfur or phosphorus-based functional groups.

A comparison of the Working Examples (WEs) and the Comparative Examples (CEs) will show that the compounded BMSC polycarbonate resins of the present invention compounded with specific phosphorus-containing compound (PCC) additive species that are acids or their thermally-decomposable salts or esters have improved color, especially their a* and b* color parameters, versus BMSC polycarbonate resins not compounded with these specific additives. It will be shown that phosphorus-based acids and their salts and esters are superior in performance to both their carbon-based and sulfur-based counterparts.

Starting Polymer Material:

Polymerization reactions to form (BMSC) polymer materials A, B, C, E, F and G, were carried out in the reactor system shown schematically in FIG. 1. In this system the oligomerization vessel A was charged at ambient temperature and pressure with the solid diol monomer, bisphenol A for the production of BPA homopolymers (HP) or additionally with hydroquinone (HQ) and/or methyl hydroquinone (MeHQ) for the preparation of a copolymer (CP) of HQ and BPA as well as terpolymers of BPA, HQ and MeHQ; solid BMSC; and the solid monofunctional phenol capping agent PCP. The mol % of monomers in the terpolymers was 33% BPA, 34% HQ, and 33% MeHQ, and the mole % was 30% HQ and 70% BPA in the case of the copolymer. The PCP chainstopper was added in an amount to yield approximately 50 mol % of PCP end groups at the targeted molecular weight. The catalysts tetramethyl ammonium hydroxide and sodium hydroxide were next added as an aqueous solution. The tetramethyl ammonium hydroxide was used at a concentration of 25 Eq/mol diol and the sodium hydroxide at a concentration of 4 Eq/mol BPA in the case of homopolymer and at a concentration of 2 Eq/mol BPA in the case of terpolymer. After this the oligomerization reactor was sealed shut. The system was deoxygenated by briefly evacuating the oligomerization reactor and then introducing nitrogen. This process was repeated three times. After a period of at least approximately 4 hours,

TABLE 1

Characterization of Starting Polymer Materials

| Polymer Material | Polymer Type | Carbonate | Mw (Dalton) | MS (ppm) | IEL (mole %) | Color Properties | | |
|---|---|---|---|---|---|---|---|---|
| | | | | | | L* | a* | b* |
| A | TP | BMSC | 33616 | 154 | 0.33 | 80.62 | 3.72 | 19.1 |
| B | TP | BMSC | 31615 | 96 | 0.45 | 69.12 | 10.49 | 17.94 |
| C | TP | BMSC | 29770 | 92 | 0.51 | 81.34 | 4.05 | 15.44 |
| D | TP | DPC | 22870 | — | — | 77.5 | 5.1 | 15.4 |
| E | CP | BMSC | 26426 | 115 | NM | 84.57 | 1.94 | 12.77 |
| F | CP | BMSC | 28707 | 140 | 0.39-0.67 (0.51 avg for 10 samples) | 86.94 | 2.09 | 13.55 |
| G | HP | BMSC | 32146 | 235 | 0.47 | 83.88 | 1.21 | 9.59 |
| H | HP | DPC | | — | — | 91.28 | −1.62 | 5.07 |

Polymerization reactions were carried out to form polymer material D in a continuous melt reactor system using diphenyl carbonate (DPC) as the carbonate monomer and bisphenol A, hydroquinone (HQ), and methyl hydroquinone (MeHQ) as the diol monomers. The terms TP, CP, and HP stand for terpolymer, copolymer, and homopolymer respectively. The mol % of the diol monomers was 30% BPA, 35% HQ, and 35% MeHQ in the terpolymer. Polymerization was conducted by continuously feeding to a monomer agitator tank the feed stocks DPC and the mixed diols at the molar ratio of 1.1:1.00. Additionally $1.5 \times 10^{-4}$ mole of tetra methyl ammonium hydroxide (TMAH) and $5 \times 10^{-6}$ mole of sodium hydroxide (NaOH) per mole of total diol were added to the monomer agitator tank as catalysts. Continuous melt polycondensation was then conducted by continuously feeding the reaction mixture from the monomer agitator tank to two vertical reactors followed by a horizontal reactor (polymerizer), while continuously removing by-product phenol from each of the reactors to effect polymerization. Polymer H is a bisphenol A homopolymer made using DPC as the diaryl carbonate.

an additional amount of sodium hydroxide was added to the molten terpolymer oligomer at a concentration of 6 Eq/mol diol.

Figure 2:
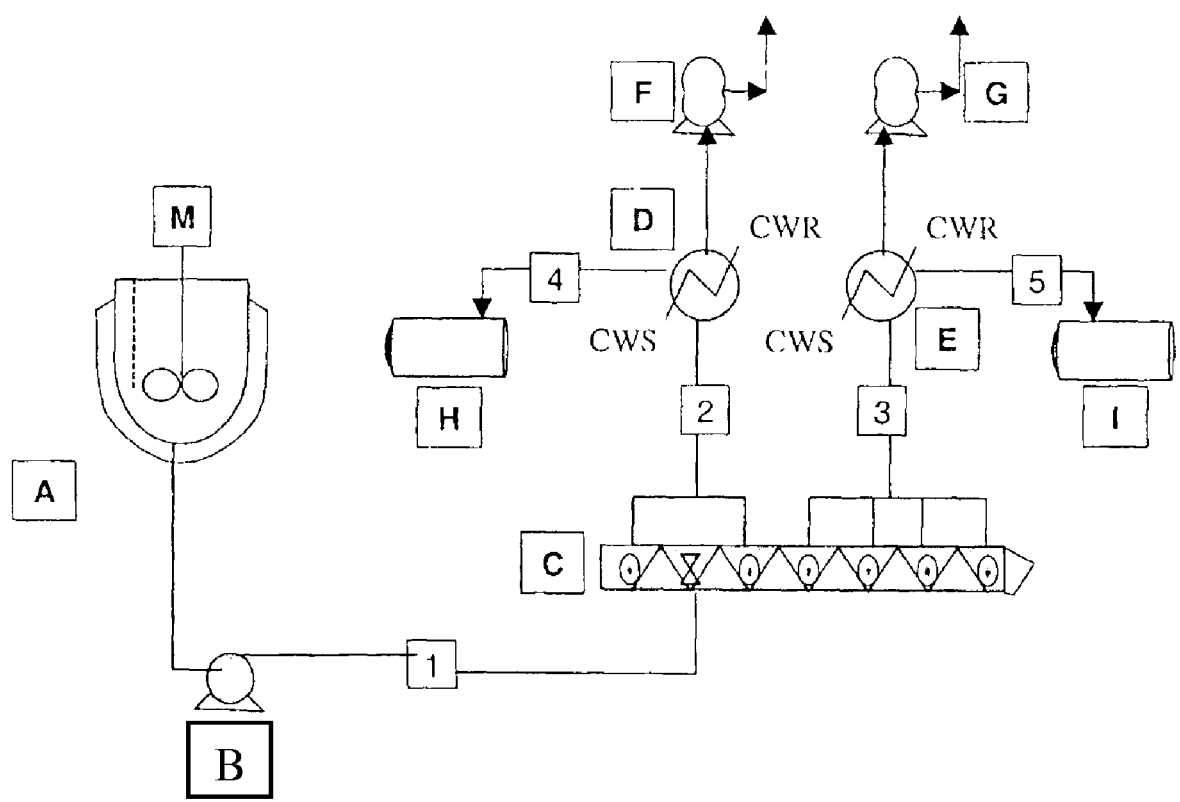
FIG. 2 shows a reactor for the preparation of polycarbonate.

The molten oligomer was then fed to a ZSK-25 extruder C by means of pump 13 and feedline 1 (FIG. 2). The ZSK-25 extruder is a 25 mm diameter, twin screw, co-rotating intermeshing extruder having a length to diameter ratio (L/D) of about 59. The oligomer was fed to the extruder at a rate of about 12 to 14 kg/h, and the screw speed was about 300 rpm. The barrels of the extruder were set at 300° C. and the die head at 310° C. The ZSK-25 extruder is equipped with a high and low vacuum system to remove the methyl salicylate formed as a by-product in the polycondensation reaction. The low vacuum system consists of line 2, condenser D, Vacuum pump F and MS holding tank H. The high vacuum system consists of line 3, condenser E, Vacuum pump G and MS holding tank I. The two low vacuum vents are operated at a vacuum level of about 14 to 20 mbar, and the subsequent four high vacuum vents are operated at a vacuum level of about 0.5 to 4 mbar. The extruder was operated under conditions of temperature, vacuum, residence time, and mixing intensity sufficient to promote polymerization.

Characterization Methods of Polymer Samples A-H:

The molecular weight properties of the polymers were determined by gel permeation chromatographic (GPC) analysis, using polycarbonate molecular weight standards to construct a broad standard calibration curve against which polymer molecular weights were determined. The temperature of the gel permeation columns was about 25° C. and the mobile phase was chloroform.

The levels of IEL and Fries in the polymers were measured by means of proton NMR. Deuterated chloroform (CDCl$_3$) was used as the solvent for the homopolymer samples, and deuterated tetrachloroethane (TCE) was used for the terpolymer samples. The values are reported as mole % relative to the incorporated diol content of the polymer. Therefore for the homopolymers, the values are reported as mole % relative to the BPA molar content and for the terpolymers as mole % relative to the total molar content of all incorporated diols (BPA, hydroquinone and methyl hydroquinone).

The Fries structures characterized in this analysis are as follows:

Linear Fries:

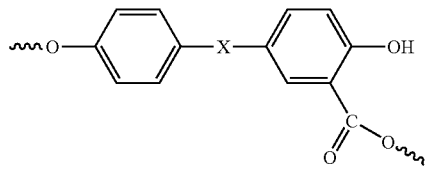

Acid Fries:

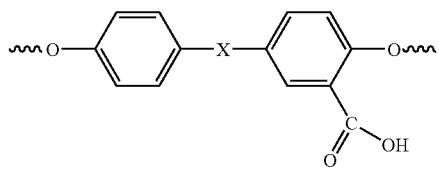

Branched Fries:

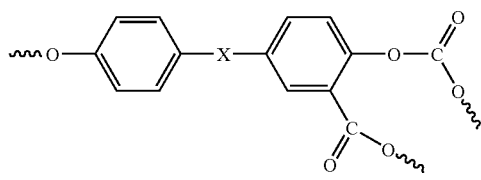

wherein X represents, for example, one of the groups of formula conventionally found in commercial polycarbonates:

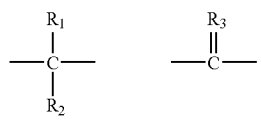

wherein R$_1$ and R$_2$ each independently represent a hydrogen atom or a monovalent linear or cyclic hydrocarbon group and R$_3$ is a divalent hydrocarbon group.

The residual methyl salicylate (MS) levels in the polymer samples were analysed by means of an HPLC analytical method. The solvent used was a 4:1 mixture of CHCl$_3$ with 1,1,1,3,3,3-hexafluoroisopropanol (HFIP). The terpolymer was first treated in an ultrasonic bath for 15 min followed by shaking for 2 hrs. Methanol was added to precipitate the polymer and the resulting solution was then filtered through a 0.2 micron filter and injected on an HPLC. In the case of homopolymers, the solvent used was methylene chloride.

The color of the pellets before and after compounding was measured by using a Xrite Teleflash 130. The instrument allows one to measure pellet color directly, eliminating the need of applying additional processing steps such as molding which can cause the color to change. For the Xrite a standard light source D65 (neutral daylight, 6500 Kelvin) with a 10° observer angle is chosen to generate L*, a*, and b* values. The pellets to be measured are placed in a glass Petri-dish with a diameter of 15 cm and a height of 4 cm. The dish is completely filled with pellets, excess pellets are removed and the surface pellets gently compressed. Next, the filled dish is placed at a fixed distance and angle from the Xrite light source and detector. Upon testing a bright light flashes and the reflected light is used by the device to determine the color L*, a*, and b* values for the sample. Each sample is measured three times in 3 different dish positions whereby the dish is rotated between each position.

Compounding of Polymers:

The (DPC & BMSC) polycarbonate materials were compounded on a Werner & Pfleiderer ZSK-25 twin-screw extruder. The additives were manually premixed with polycarbonate resin powder (in all cases 5% of interfacial polycarbonate powder is used to mix the additives) and further homogenized using a shaking device. This polycarbonate premix was then fed to the extruder together with the polycarbonate material in a 1:19 ratio. The barrel temperature of the extruder was set at 300° C. while a vacuum in the range of 150 to 350 mbar was applied. The extruded polymer strands were briefly cooled by passing them through a water bath and finally pelletized.

TABLE 2

Characterization of Terpolymer Compounded Pellets

| Example | Terpolymer Sample | Additive Type | [Additive] [ppm] | Color After Compounding | | |
|---|---|---|---|---|---|---|
| | | | | L* | a* | b* |
| CE 1 | A | none | — | 75.5 | 5.8 | 22.5 |
| WE 1 | A | H$_3$PO$_3$ | 100 | 82.0 | 2.2 | 17.9 |
| CE 2 | A | Fumaric acid (C$_4$H$_4$O$_4$) | 150 | 77.1 | 4.4 | 22.4 |
| CE 3 | A | Salicylic acid | 170 | 74.5 | 6.4 | 22.4 |
| CE 4 | A | Sulphuric acid | 120 | 73.8 | 2.3 | 16.6 |
| CE 5 | A | Water | 1080 | 72.8 | 7.3 | 21.0 |
| CE 6 | A | Irgafos ™ 168 | 1000 | 76.5 | 5.3 | 22.1 |
| CE 7 | A | PEPQ | 1000 | 77.7 | 5.2 | 21.2 |
| CE 8 | A | pTSA | 210 | 77.4 | 3.8 | 19.2 |
| WE 2 | A | Weston618 | 500 | 81.6 | 2.8 | 18.2 |
| CE 9 | B | none | — | 68.2 | 12.5 | 22.0 |
| WE 3 | B | H$_3$PO$_3$ | 10 | 83.3 | 1.0 | 13.4 |
| WE 4 | B | H$_3$PO$_3$ | 15 | 86.5 | 0.3 | 12.3 |
| WE 5 | B | H$_3$PO$_3$ | 20 | 87.4 | 0.1 | 11.8 |
| WE 6 | B | Zn(H$_2$PO$_4$)$_2$ (mono-zincphosphate) | 18 | 76.5 | 3.3 | 14.2 |
| WE 7 | B | Zn(H$_2$PO$_4$)$_2$ (mono-zinc phosphate) | 27 | 77.1 | 3.2 | 14.1 |
| WE 8 | B | Zn(H$_2$PO$_4$)$_2$ (mono-zinc phosphate) | 36 | 77.3 | 2.5 | 14.0 |
| CE 10 | B | Zn$_3$(PO$_4$)$_2$ (zinc phosphate) | 39 | 68.3 | 11.8 | 20.3 |

TABLE 2-continued

Characterization of Terpolymer Compounded Pellets

| Ex-ample | Terpolymer Sample | Additive Type | [Additive] [ppm] | Color After Compounding L* | a* | b* |
|---|---|---|---|---|---|---|
| CE 11 | C | none | — | 75.0 | 6.6 | 18.9 |
| CE 12 | C | $H_3PO_3$ | 2 | 79.5 | 4.0 | 16.2 |
| WE 9 | C | $H_3PO_3$ | 9 | 80.9 | 3.5 | 15.5 |
| WE 10 | C | $H_3PO_3$ | 15 | 81.8 | 3.1 | 14.8 |
| WE 11 | C | $(NH_4)_2HPO_4$ | 3 | 79.6 | 3.9 | 15.9 |
| WE 12 | C | $(NH_4)_2HPO_4$ | 14 | 80.0 | 3.7 | 15.3 |
| WE 13 | C | $(NH_4)_2HPO_4$ | 25 | 79.9 | 3.6 | 15.2 |
| CE 13 | C | Butyl Tosylate | 5 | 75.5 | 5.3 | 16.8 |
| CE 14 | C | Butyl Tosylate | 24 | 78.2 | 4.3 | 15.6 |
| CE 15 | C | Butyl Tosylate | 43 | 78.5 | 4.1 | 16.0 |
| CE 16 | D | none | — | 73.4 | 6.3 | 17.3 |
| CE 17 | D | $H_3PO_3$ | 15 | 75.0 | 5.9 | 16.2 |

TABLE 3

Characterization of Copolymer Compounded Pellets

| Copolymer Example | Co-polymer Sample | Additive Type | [Additive] [ppm] | Color After Compounding L* | a* | b* |
|---|---|---|---|---|---|---|
| WE 14 | E | $H_3PO_3$ | 4.4 | 83.5 | 0.4 | 13.5 |
| WE 15 | E | $H_3PO_3$ | 11.1 | 84.8 | 0.2 | 12.8 |
| WE 16 | E | $H_3PO_3$ | 7.8 | 83.8 | 0.3 | 13.4 |
| CE 18 | F | none | 0 | 83.89 | 0.67 | 14.67 |
| CE 19 | F | $H_3PO_3$ | 3 | 86.84 | −0.43 | 14.99 |
| WE 17 | F | $H_3PO_3$ | 6 | 89.02 | −0.83 | 13.81 |
| WE 18 | F | $H_3PO_3$ | 9 | 88.98 | −0.91 | 13.77 |
| WE 19 | F | $(NH_4)_2HPO_4$ | 5 | 87.63 | −0.45 | 14.63 |
| WE 20 | F | $(NH_4)_2HPO_4$ | 14.5 | 88.37 | −0.66 | 13.92 |
| CE 20 | F | Irgaphos 168 | 500 | 85.31 | 0.19 | 14.41 |
| WE 21 | F | Irgaphos 168 + $H_3PO_3$ | 500 + 9 | 87.3 | −0.33 | 13.71 |

TABLE 4

Characterization of Homopolymer Compounded Pellets

| Ex-ample | Homopolymer Sample | Additive Type | [Additive] [ppm] | Color After Compounding L* | a* | b* |
|---|---|---|---|---|---|---|
| CE 23 | G | none | | 79.76 | 1.09 | 13.29 |
| WE 22 | G | $H_3PO_3$ | 100 | 82.73 | 0.38 | 10.15 |
| WE 23 | G | Weston | 500 | 84.74 | 0.2 | 9.75 |
| WE 24 | G | $Zn(H_2PO_4)_2$ (mono-zinc phosphate) | 27 | 82.66 | 0.59 | 10.34 |
| CE 24 | H | none | | 89.23 | −1.28 | 8.19 |
| CE 25 | H | $H_3PO_3$ | 100 | 87.92 | −1.09 | 6.63 |
| CE 26 | H | Weston | 500 | 90.61 | −1.43 | 6.24 |

Discussion of WEs (1-24) and CEs (1-26):

Table 1 gives the properties of the extruded pellets that were used as the starting materials in the examples outlined in the compounded examples of Table 2 to 4. It can be seen that there may be some run-to-run variation in the melt-terpolymers prepared using BMSC depending on factors such as the quality of the comonomers used and the state of the operation of the reaction system. The particular (DPC) terpolymer (D) used in this study has quite similar color properties to that of the (BMSC) terpolymers, namely materials A and C. The initial color properties (uncompounded) of the (BMSC) copolymer (E) and (BMSC) homopolymer (G) are also somewhat better than those of the (BMSC) terpolymers, perhaps because of their lower content or absence of quinone-based comonomers, but not as good as the comparable DPC polycarbonate (F and H).

Table 2 gives a comparison between compounded materials prepared from terpolymer starting materials A to D and compounded using various concentrations of different additives. It can be seen that the compounding "blanks", CE 1, CE 9, and CE 11, all have worse color properties (L*, a*, and b*) than their starting material counterparts in Table 1. These blanks were subjected to the same compounding process together with the 5 mass % of polycarbonate resin powder, but no compounding additive was present.

In contrast, it can be seen from the first working example (WE 1) that the use of low levels of the acidic phosphorus compound, $H_3PO_3$, as a compounding additive surprisingly leads to a significant improvement in the color properties of the compounded pellets relative to those of both the starting material A in Table 1, as well as the compounding blank in Table 2 (CE 1). Although all three of the color parameters are improved, the improvement in the a* value is most pronounced. Quite surprisingly the use of other acids not containing the element phosphorus (CE 2 to CE 4) do not lead to an improvement in the color properties (L*, a*, and b*). It can also be seen from the comparative example, CE 5, that the use of the protic compound water as compounding agent also brings no color benefit.

Comparative Examples 6 and 7 (CE 6 & 7) demonstrate that the use of standard polycarbonate additives known in the art, such as Irgafos™ 168 (Tris(2,4-ditert-butylphenyl) phosphite CAS Number: 31570-04-4) and IRGAFOS™ P-EPQ (CAS number 119345-01-6), do not bring any benefit in terms of reducing the color of the polycarbonate. The L* value is lower and the a* and b* values are higher in both cases. It should be noted that both of these additives are hydrolytically-stabilized through the use of hindered phenols in the preparation. In contrast, a hydrolytically less stable additive, such as a distearyl pentaerythritol diphosphite (for example WESTON® 618), is shown to be quite effective in reducing the color of the starting (BMSC) polycarbonate.

The (BMSC) terpolymer B from another production run having much poorer initial color than that of starting material A was next evaluated. Working Examples 3 to 5 again show a significant improvement in color when the (BMSC) terpolymer is compounded with the acidic phosphorus compound $H_3PO_3$. In particular the improvements in the L* and a* parameters are most dramatic, and the improvement is greater for higher concentrations of added acid. Working examples 6 to 8 also demonstrate that the color of (BMSC) polymers can be improved when they are compounded with salts such as mono-zinc phosphate that thermally degrade to yield acidic species. Again the color benefit is most pronounced in the a* color parameter, and it increases with increasing concentration of the salt. Another phosphate salt compound, zinc phosphate, that does not decompose to give an acidic species was also evaluated. In contrast to the previous three examples, this compound yielded no color benefit, even at a relatively high concentration.

A third (BMSC) terpolymer (C) having somewhat better color was evaluated. In this case, Comparative Example CE 12 demonstrates that the acidic phosphorus-containing additive does not bring any color benefit if the amount in which it is added is too low. At such low levels of added PCC, an improvement may be seen relative to the "blank" extruded polycarbonate containing no PCC (CE 11), but not relative to the uncompounded starting polycarbonate (Polycarbonate C in Table 1). Working Examples WE 9 and WE 10 demonstrate for this particular (BMSC) terpolymer that color benefits of $H_3PO_3$ become observable at a level of about 10 ppm and increase with further increases in concentration. Working Examples WE 11 to WE 13 demonstrate that the use of thermally degradable organic phosphate salts like diammonium hydrogen phosphate also lead to improvements in the a* color parameter. The Comparative Examples CE 13 to CE 15 demonstrate that sulfonic acid esters are ineffective in improving the color of the (BMSC) polycarbonate relative to both the starting material and the compounding blank CE 11.

It was evaluated whether this unique reduction in color of melt polycarbonate resins prepared through the use of activated salicylate-based carbonates (e.g. BMSC polycarbonates) could also be replicated in conventional melt polycarbonates prepared through the use of diphenyl carbonate (DPC polycarbonates). Comparative Example CE 16 shows that the compounding blank of the DPC polycarbonate is worse in all three color parameters than its starting material (Polymer Material D in Table 1). Comparative Example CE 17 demonstrates that the use of the phosphorus-containing compound $H_3PO_3$ does not significantly improve the color properties of the DPC polycarbonate terpolymer compared to either the starting material (Polymer Material D) or the compound blank (CE 16). It can be concluded that the process of this invention is effective in reducing the color of certain types of melt polycarbonates produced using activated salicylate-based carbonates although the mechanism is not understood.

ates, relative to their starting neat resin (Polymer Material F) and their compounding "blank." Comparative Example CE 18. CE 20 and WE 21 shows that benefit from the addition of phosphorus-containing compound, even in the presence of other additives such as Irgafos™ as described above.

The Working Examples WE 22 to WE 24 in Table 3 indicate that the use of PCCs (WE 22), their thermally or hydrolytically unstable esters (WE 23), and their organic thermally or hydrolytically unstable salts (WE 24) are all effective in reducing the color of homopolymers, made using activated salicylate-based carbonates, relative to their starting neat resin (Polymer Material G) and their compounding blank CE 23. Comparative examples CE 24 to CE 26 show the limited or negative effect of the phosphorus-containing compound with a DPC-based homopolymer (Polymer Material H).

The effect of phosphorus acid, $H_3PO_3$ on color under different compounding conditions was tested. For homopolymer, copolymer and terpolymer polycarbonates compounding/extrusion was done as described generally above, but with different process parameters as set forth in Table 5. The color properties of the resulting pellets were determined. As shown in Table 5, compounding results in poorer color properties when the PCC was not present (CF 28-36). In contrast, the degradation of color properties was lessened or, particularly in the case of the terpolymer, the color properties improved at moderate extrusion conditions (compare CE 34, CE 36 and WE 30).

TABLE 5

| Ex | Polymer | [H3PO3] (ppm) | Target rpm | Target Tq (%) | Throughput (kg/h) | rpm | Tq (%) | T-melt (° C.) | T-last barrel (° C.) | Tq average (%) | E-spec (Kw * h/Kg) | L | a | b |
|---|---|---|---|---|---|---|---|---|---|---|---|---|---|---|
| CE 28 | HP | None | | | | UNCOMPOUNDED | | | | | | 88.0 | 0.65 | 9.21 |
| CE 29 | HP | None | 600 | 75 | 38 | 600 | 72-77 | 364 | 300 | 74.5 | 0.21 | 87.36 | -0.48 | 11.74 |
| CE 30 | HP | None | 300 | 50 | 13 | 300 | 50-55 | 331 | 296 | 52.5 | 0.22 | 87.17 | -0.33 | 13.43 |
| WE 20 | HP | 6.5 | 600 | 75 | 36 | 600 | 72-77 | 369 | 304 | 74.5 | 0.22 | 88.12 | -0.77 | 10.35 |
| WE 21 | HP | 6.5 | 300 | 75 | 22 | 300 | 73-77 | 339 | 297 | 75 | 0.18 | 88.45 | -0.66 | 10.37 |
| WE 22 | HP | 6.5 | 300 | 50 | 13 | 300 | 50-54 | 337 | 299 | 52 | 0.22 | 88.46 | -0.62 | 10.92 |
| WE 23 | HP | 6.5 | 600 | 50 | 22 | 600 | 51-54 | 372 | 304 | 52.5 | 0.26 | 87.5 | -0.28 | 10.81 |
| CE 31 | CP | None | | | | UNCOMPOUNDED | | | | | | 86.5 | 1.09 | 12.36 |
| CE 32 | CP | None | 600 | 75 | 40 | 600 | 71-79 | 363 | 300 | 75 | 0.20 | 84.27 | -0.1 | 14.82 |
| CE 33 | CP | None | 300 | 50 | 14 | 300 | 50-54 | 333 | 296 | 52 | 0.20 | 84.55 | 0.08 | 15.03 |
| WE 24 | CP | 9.4 | 600 | 75 | 38 | 600 | 72-78 | 369 | 307 | 75 | 0.21 | 86.04 | -0.66 | 13.29 |
| WE 25 | CP | 9.4 | 300 | 75 | 23.5 | 300 | 73-79 | 336 | 296 | 76 | 0.17 | 86.76 | -0.59 | 13.32 |
| WE 26 | CP | 9.4 | 300 | 50 | 13 | 300 | 49-53 | 336 | 298 | 51 | 0.21 | 85.79 | -0.19 | 13.66 |
| WE 27 | CP | 9.4 | 600 | 50 | 22 | 600 | 49-53 | 371 | 303 | 51 | 0.25 | 85.81 | -0.29 | 13.45 |
| CE 34 | TP | None | | | | UNCOMPOUNDED | | | | | | 82.0 | 3.37 | 15.77 |
| CE 35 | TP | None | 600 | 75 | 44 | 600 | 74-78 | 354 | 300 | 76 | 0.19 | 78.94 | 2.18 | 16.59 |
| CE 36 | TP | None | 300 | 50 | 16 | 300 | 50-53 | 326 | 296 | 51.5 | 0.17 | 78.21 | 3.84 | 17.25 |
| WE 28 | TP | 15.9 | 600 | 75 | 42 | 600 | 73-77 | 362 | 300 | 75 | 0.19 | 80.97 | 1.21 | 16.3 |
| WE 29 | TP | 15.9 | 300 | 75 | 26.5 | 300 | 75-77 | 330 | 297 | 76 | 0.15 | 82.24 | 1.01 | 16.09 |
| WE 30 | TP | 15.9 | 300 | 50 | 15 | 300 | 49-51 | 331 | 298 | 51 | 0.18 | 82.27 | 1.09 | 14.82 |
| WE 31 | TP | 15.9 | 600 | 50 | 24 | 600 | 48-51 | 363 | 303 | 50.5 | 0.23 | 81.46 | 1.01 | 14.11 |

It was also evaluated whether the benefit in color reduction could be obtained in other types of (BMSC) polycarbonates. The Working Examples WE 14 to WE 16 in Table 3 demonstrate, inter alia, that the use of the phosphorus-containing compound $H_3PO_3$ is also effective in reducing color of copolymers of hydroquinone (Polymer Material E). A color benefit in a* becomes observable in this particular copolymer system at concentrations as low as about 4 ppm, and increases with increasing concentration of the PCC additive. The Working Examples WE 17 to WE 20 in Table 3 indicate that the use of PCCs (WE 17-20) are all effective in reducing the color of copolymers, made using activated salicylate-based carbon- Additional Compounding Examples:

A terpolymer polymer material X was prepared in the reactor system shown schematically in FIG. 2 using the diols BPA, HQ and MeHQ; solid BMSC; and the solid monofunctional phenol capping agent PCP. The same process conditions were used to produce this polymer material X as in polymer materials A-C in Table 1.

The molecular weight properties and the residual methyl salicylate (MS) level of the polymer material X were characterized by means of GPC and HPLC, using the same methods as described earlier for the other polymer materials A-H. The weight average molecular weight (Mw) of polymer material X was determined to be 29,252 Dalton, and the residual MS level was 67 ppm.

The polymer material X was next compounded with an anhydride, amide, acidic or ester-based phosphorus-containing compound (PCC) additive on a Werner & Pfleiderer ZSK-25 twin-screw extruder. After premixing of the respective PCC additives with polycarbonate resin powder, the additives were compounded with terpolymer polymer material X using the same compounding conditions as in the earlier examples. The anhydride PCC was phosphorus pentoxide ($P_2O_5$, CAS #1314-56-3), the amide PCC was tris(N,N-tetramethylene) phosphoric acid triamide ($C_{12}H_{24}N_3OP$, CAS #6415-07-2), the acidic PCC was phosphorus acid ($H_3PO_3$, CAS #13598-36-2), and the ester PCC was a distearyl pentaerythritol diphosphite (for example WESTON® 618). The levels of the PCC additives were varied to give various PCC concentrations (ppm) and thus also various PCC/catalyst molar ratios in the compounded resins. The PCC/catalyst molar ratios were then multiplied by the number of phosphorus atoms in the PCC to give the P/catalyst molar ratio. For example, the P/catalyst molar ratio is the same as the PCC/catalyst molar ratio in the case of the PCC phosphorus acid ($H_3PO_3$), but it is twice as high when phosphorus pentoxide ($P_2O_5$) is used as the PCC.

The color of the compounded pellets was measured before and after compounding using an Xrite Teleflash 130, as described in the earlier examples. The results of the color measurements of the non-compounded starting pellets (Example A), the compounding blank (Example B), and the pellets compounded with various amounts of PCC's and thus various P/cat molar ratios (Examples C to T) are tabulated below in Table 6.

as phosphorus pentoxide ($P_2O_5$) are quite effective in reducing the color of polycarbonates formed by a melt transesterification method using an activated diaryl carbonate (BMSC). Although the benefit of this PCC tends to increase systematically with increases in the P/catalyst ratio, the benefit of further increases in this ratio appear to diminish at relatively high ratios. For example, increasing the P/catalyst ratio from 5 (Example D) to 10 (Example E) or 24 (Example F) does not seem to result in large-scale further reductions in color, whereas the color improvement was quite substantial when the P/catalyst ratio was increased from 0.5 (Example C) to 5 (Example D).

A comparison of the color data from Examples G and H with the uncompounded starting material (Example A) or the compounding blank (Example B) demonstrates that amide PCC's such as tris(N,N-tetramethylene)phosphoric acid triamide ($C_{12}H_{24}N_3OP$) are also effective in reducing the color of polycarbonates formed by a melt transesterification method using an activated diaryl carbonate (BMSC). It is noteworthy that this benefit in color reduction is only partially effective at a P/catalyst ratio as low as 12 (Example H). Without intending to be bound by any particular mechanism, the inventors believe that the amide functionality of this PCC may lead to the formation of nitrogen-related color bodies and thus limit somewhat the color-improving function of such amide PCC's, especially at relatively high P/catalyst ratios.

The color data from Examples I to T illustrate the effect of increases in the P/catalyst ratio of an acidic PCC and an ester PCC on the color reduction of polycarbonates formed by a melt transesterification method using an activated diaryl carbonate (BMSC). In Examples I to N an acidic PCC, phosphorus acid ($H_3PO_3$), was used, and in Examples O to T an ester PCC, WESTON® 618, was used. Although both of these

TABLE 6

Terpolymer X compounded with various PCC's

| Polymer Type | Example | PCC | PCC [ppm] | PCC/catalyst ratio | P/catalyst ratio | Color after Compounding L* | a* | b* |
|---|---|---|---|---|---|---|---|---|
| X | A | none (initial color as polymerized, not compounded) | 0 | 0 | 0 | 76.76 | 4.35 | 16.77 |
| X | B | none (compounding blank) | 0 | 0 | 0 | 74.9 | 3.0 | 16.4 |
| X | C | P2O5 | 1 | 0.25 | 0.5 | 76.7 | 2.2 | 16.0 |
| X | D | P2O5 | 10 | 2.5 | 5 | 78.8 | 1.6 | 15.4 |
| X | E | P2O5 | 18 | 5 | 10 | 77.6 | 1.7 | 15.3 |
| X | F | P2O5 | 43 | 12 | 24 | 77.7 | 1.6 | 15.2 |
| X | G | TNNTMPATA | 18 | 5 | 5 | 76.8 | 2.8 | 16.3 |
| X | H | TNNTMPATA | 43 | 12 | 12 | 72.4 | 5.1 | 15.2 |
| X | I | H3PO3 | 1 | 0.25 | 0.25 | 76.3 | 2.9 | 16.5 |
| X | J | H3PO3 | 10 | 2.5 | 2.5 | 78.8 | 2.0 | 16.0 |
| X | K | H3PO3 | 20 | 4.9 | 4.9 | 80.1 | 1.7 | 15.3 |
| X | L | H3PO3 | 50 | 12.2 | 12.2 | 79.6 | 1.7 | 15.4 |
| X | M | H3PO3 | 100 | 24.4 | 24.4 | 80.0 | 1.4 | 15.5 |
| X | N | H3PO3 | 500 | 122 | 122 | 79.2 | 1.1 | 15.9 |
| X | O | WESTON ® 618 | 4.5 | 0.25 | 0.5 | 76.2 | 2.7 | 15.7 |
| X | P | WESTON ® 618 | 45 | 2.5 | 5 | 78.1 | 2.0 | 15.9 |
| X | Q | WESTON ® 618 | 89 | 4.9 | 9.8 | 79.3 | 1.7 | 16.0 |
| X | R | WESTON ® 618 | 223 | 12.2 | 24.4 | 80.3 | 1.4 | 15.2 |
| X | S | WESTON ® 618 | 446 | 24.4 | 48.8 | 80.4 | 1.3 | 15.1 |
| X | T | WESTON ® 618 | 2232 | 122 | 244 | 80.5 | 1.1 | 14.8 |

The data from the Examples A to T in Table 6 above demonstrate various aspects of the invention. A comparison of the color data from Examples C to F with the uncompounded starting material (Example A) or the compounding blank (Example B) demonstrates that anhydride PCC's such PCC's are quite effective in reducing color, at quite high P/catalyst ratios there is an apparent limitation in further reductions in color as the ratio is further increased. For example, further increasing the P/catalyst ratio from 24.4 (Example M) to 122 (Example N) in the case of phosphorus acid ($H_3PO_3$) gave only mixed results in terms of a further color reduction. In the case of the ester PCC, WESTON® 618 (as described above), a tenfold increase in P/catalyst ratio from 24.4 (Example S) to 244 (Example T) led to only quite modest further reductions in color.

Finally a comparison of Examples C to F (anhydride PCC) with Examples G and H (amide PCC), Examples I to N (acidic PCC), or with Examples O to T (ester PCC) demonstrates that, although all of these PCC's are quite effective in reducing color of polycarbonates formed by a melt transesterification method using an activated diaryl carbonate, their relative effectiveness in color reduction and the exact relationship between the color-improving function of these various PCC's and their P/catalyst ratios will depend somewhat on the nature of the PCC and its structure and properties.

II: PCC Addition Improves UV Retention in PC/UV absorber blends

The addition of a phosphorus-containing compound has also proven useful in polycarbonate blends comprising an UV absorber. The Examples provided below describe the need of stabilization of two different polymer blends. The first polymer blend is derived from a melt polycarbonate incorporating quinone type monomers and prepared with either a diaryl carbonate such as DPC or an activated diaryl carbonate such as BMSC and having UV absorbers (having a free OH group which adds to the effectiveness of the UV stabilizer). The second polymer blend is derived from a melt polycarbonate prepared from an activated diaryl carbonate such as BMSC and having the same UV stabilizer. These polymer blends are then stabilized with a PCC compound such as with $H_3PO_3$. Without stabilization of the polymer blends, the free-OH groups of the UV absorber will react with the polymer backbone leading in molecular weight loss. Without being bound by a mode of operation, it is believed that the transesterification catalyst remaining in the polycarbonate polymer from its production catalyzes this backbiting reaction.

Definition of UV Retention

The UV retention is measured by UV-VIS spectroscopy by scanning 0.08 g of polymer dissolved in 20 ml CHCl3/HFIP 90/10% (v/v) from 270 to 410 nm. The UV retention is a measure of the reactivity of the polymer. If the UV absorber reacts with the polymer the second absorption band will decrease. In the case of particular UV absorbers used in the examples, it is as follows for Cyasorb™ 5411: (Absorption max at 336 nm/absorption max at 302 nm)*100% for Tinuvin™ 350: (Absorption max at 340 nm/absorption max at 307 nm)*100%.

TABLE 7

Starting polymer materials

| Polymer material | Polymer type | Carbonate | Mw, PS (g/mole) |
|---|---|---|---|
| I | HP | Phosgene | 65747 |
| J | HP | DPC | 61881 |
| K | HP | DPC | 58844 |
| L | TP | DPC | 61866 |
| M | TP | BMSC | 64789 |
| N | TP | BMSC | 54964 |
| O | HP | BMSC | 58941 |
| P | TP | BMSC | 58775 |

Polymer I is made via the interfacial process in a batch reactor system using phosgene as the carbonate monomer and bisphenol A as the diol.

Polymer J is made via a melt polymerization in a continuous melt reactor system using DPC as the carbonate monomer and bisphenol A as the diol.

Polymer K is made via a melt polymerization in a continuous melt reactor system using DPC as the carbonate monomer and bisphenol A as the diol.

Polymer L is made via a melt polymerization in a continuous melt reactor system using DPC as the carbonate monomer and BPA, HQ and MeHQ as the diols. The mole % of the diol was 33% BPA, 34% HQ and 33% MeHQ. Additionally $50*10^{-6}$ mole TBPA and $7.5*10^{-6}$ mole NaOH per mole of total diol were added to the monomer agitator as catalysts.

Polymer M is made via a melt polymerization in a continuous melt reactor system using BMSC as the carbonate monomer and BPA, HQ and MeHQ as the diols. The mole % of the diol was 33% BPA, 34% HQ, 33% MeHQ. Additionally $25*10^{-6}$ mole TMAH and $7.8*10^{-6}$ mole NaOH per mole of total diol were added to the monomer agitator as catalysts.

Polymer N is made via a melt polymerization in a continuous melt reactor system using BMSC as the carbonate monomer and BPA, HQ and MeHQ as the diols. The mole % of the diol was 33% BPA, 34% HQ, 33% MeHQ. Additionally $25*10^{-6}$ mole TMAH and $8*10^{-6}$ mole NaOH per mole of total diol were added to the monomer agitator as catalysts.

Polymer O is made via a melt polymerization in a continuous melt reactor system using BMSC as the carbonate monomer and BPA as the diol. Additionally $25*10^{-6}$ mole TMAH and $4.6*10^{-6}$ mole NaOH per mole of total diol were added to the monomer agitator as catalysts.

Polymer P is made via a melt polymerization in a continuous melt reactor system using BMSC as the carbonate monomer and BPA, HQ and MeHQ as the diols. The mole % of the diol was 33% BPA, 34% HQ, 33% MeHQ. Additionally $25*10^{-6}$ mole TMAH and $8*10^{-6}$ mole NaOH per mole of total diol were added to the monomer agitator as catalysts.

Description of Melt-Stability Testing

The melt stability is a measure of the loss in molecular weight after a processing step compared with the molecular weight of the original pellets. The molecular weight is measured (and the Mw Loss calculated) after the next processing steps.

Compounding occurred under the same conditions as described in the above examples. The compounded pellets were dried before molding at 105° C. for 3 hours. The conditions applied on an Engel 45 Tons molding machine are described in Table 8. The test specimen molded is a plaque of 60×60×2.5 mm.

In the tables below reference is made to "Mw Loss (%) comp" which is the relative molecular weight loss of the resin occurring as a result of the compounding process. It is calculated from the molecular weight of the initial resin pellets (Mw pellets) and the compounded resin pellets (Mw compounded) by this equation: (Mw loss (%) comp.=((Mw compounded−Mw pellets)/Mw pellets )*100%).

In the tables below reference is made to "Mw loss (%) STD" which is the relative molecular weight loss of the resin occurring as a result of both the compounding and the standard molding processes. It is calculated from the molecular weight of the initial resin pellets (Mw pellets) and the resin after standard molding (Mw after STD molding) by this equation: (Mw loss (%) STD=((Mw after STD molding−Mw pellets)/Mw pellets )*100%).

TABLE 8

| Molding conditions | | |
|---|---|---|
| Machine | | Engel 45T |
| Predry temp | ° C. | 105 |
| Predry time | hr | 3 |
| Temp. Hopper | ° C. | 40 |
| Temp. zone 1 | ° C. | 280 |
| Temp. Zone 2 | ° C. | 290 |
| Temp. Zone 3 | ° C. | 300 |
| Temp. Nozzle | ° C. | 295 |
| Temp. Mold | ° C. | 90 |
| Holding time | sec | 10 |

TABLE 8-continued

| Molding conditions | | |
|---|---|---|
| Machine | | Engel 45T |
| Cooling time | sec | 20 |
| Cycletime | sec | 36 |
| Residence time | sec | 180 |

Results

Tables 9 through 11 provide the results of the compounded polymers: composition, measurement results (melt stability & UV retention)

TABLE 9

BMSC - Terpolymer

| | Work. Ex. number | | | | | |
|---|---|---|---|---|---|---|
| | | | | | 32 | 33 |
| | Comp. Ex. number | | | | | |
| | 37 | 38 | 39 | | 40 | |
| | BMSC - Terpolymer | | | | | |
| Polymer I | 5.00 | | | | | |
| Polymer J | | | | | | |
| Polymer K | | | | | | |
| Polymer L | | | | | | |
| Polymer M | 95 | 99.96 | 99.75 | 99.71 | 99.75 | 99.71 |
| Polymer N | | | | | | |
| Polymer O | | | | | | |
| Polymer P | | | | | | |
| Tinuvin ™ 350 | | | | | 0.25 | 0.25 |
| Cyasorb ™ 5411 | | | 0.25 | 0.25 | | |
| H3PO3 | | 0.0004 | | 0.0004 | | 0.0004 |
| PEPQ | | 0.04 | | 0.04 | | 0.04 |
| ratio H3PO3/cat. | | 1, 13 | | 1, 13 | | 1, 13 |
| Mw, PS | | | | | | |
| pellets | 64789 | 64789 | 64789 | 64789 | 64789 | 64789 |
| Compounded | 56086 | 61305 | 53843 | 60753 | 53776 | 59701 |
| Mw after STD molding | 56547 | 59896 | 52963 | 56717 | 52176 | 57854 |
| Mw loss (%) comp. | −13 | −5 | −17 | −6 | −17 | −8 |
| Mw loss (%) STD | −13 | −8 | −18 | −12 | −19 | −11 |
| UV retention (%) | | | | | | |
| after compounding | | | 14 | 84 | 11 | 84 |
| after molding | | | 16 | 28 | 13 | 66 |

| | Work. Ex. number | | | |
|---|---|---|---|---|
| | | | 34 | 35 |
| | Comp. Ex. number | | | |
| | 41 | 42 | | |
| | BMSC - Terpolymer | | | |
| Polymer I | | 5.00 | 5.00 | 4.75 | 4.75 |
| Polymer J | | | | | |
| Polymer K | | | | | |
| Polymer L | | | | | |
| Polymer M | | | | | |
| Polymer N | 95 | 95.00 | 95.00 | 95.00 |
| Polymer O | | | | | |
| Polymer P | | | | | |
| Tinuvin ™ 350 | | | 0.25 | |
| Cyasorb ™ 5411 | | | | 0.25 |
| H3PO3 | | 0.001506 | 0.001506 | 0.001506 |
| PEPQ | | | | |
| ratio H3PO3/cat. | | 5 | 5 | 5 |
| Mw, PS | | | | |
| pellets | 54964 | 54964 | 54964 | 54964 |
| Compounded | 50298 | 55003 | 54989 | 55052 |

TABLE 9-continued

| | BMSC - Terpolymer | | | |
|---|---|---|---|---|
| Mw after STD molding | 51537 | 55397 | 54934 | 53533 |
| Mw loss (%) comp. | -8 | 0 | 0 | 0 |
| Mw loss (%) STD | -6 | 1 | 0 | -3 |
| UV retention (%) | | | | |
| after compounding | | | 84 | 86 |
| after molding | | | 83 | 85 |

TABLE 10

| | BMSC - Terpolymer | | | | | |
|---|---|---|---|---|---|---|
| | | | | Work. Ex. number | | |
| | | | | 36 | 37 | 38 |
| | | | Comp. Ex. number | | | |
| | 43 | 44 | 45 | | | |
| | | | BMSC - Terpolymer | | | |
| Polymer I | 5.00 | 5.00 | 4.75 | 4.75 | 4.75 | 4.75 |
| Polymer J | | | | | | |
| Polymer K | | | | | | |
| Polymer L | | | | | | |
| Polymer M | | | | | | |
| Polymer N | | | | | | |
| Polymer O | | | | | | |
| Polymer P | 95 | 95 | 95 | 95 | 95 | 95 |
| Tinuvin ™ 350 | | | | | | |
| Cyasorb ™ 5411 | | | 0.25 | 0.25 | 0.25 | 0.25 |
| H3PO3 | | 0.000911 | | 0.000364 | 0.000911 | 0.001822 |
| PEPQ | | | | | | |
| ratio H3PO3/cat. | | 5 | | 2 | 5 | 10 |
| Mw, PS | | | | | | |
| pellets | 58775 | 58775 | 58775 | 58775 | 58775 | 58775 |
| Compounded | 52568 | 57402 | 49754 | 55811 | 57007 | 56910 |
| Mw after STD molding | 46587 | 56613 | 43190 | 53758 | 56660 | 56659 |
| Mw loss (%) comp. | -11 | -2 | -15 | -5 | -3 | -3 |
| Mw loss (%) STD | -21 | -4 | -27 | -9 | -4 | -4 |
| UV retention (%) | | | | | | |
| after compounding | | | 49 | 67 | 67 | 68 |
| after molding | | | 27 | 63 | 67 | 68 |

TABLE 11

| | DPC Terpolymer and Interfacial Homopolymer | | | | | | | |
|---|---|---|---|---|---|---|---|---|
| | | | | | Work. Ex. number | | | |
| | | | | | 39 | 40 | | |
| | | | | Comp. Ex. number | | | | |
| | 46 | 47 | 48 | 49 | | | 50 | 51 |
| | | | | DPC Terpolymer | | | Interfacial | |
| Polymer I | 5.00 | 4.75 | 4.75 | 5.00 | 4.75 | 4.75 | 100.00 | 99.75 |
| Polymer J | | | | | | | | |
| Polymer K | | | | | | | | |
| Polymer L | 95 | 95.00 | 95.00 | 95.00 | 95.00 | 95.00 | | |
| Polymer M | | | | | | | | |
| Polymer N | | | | | | | | |
| Polymer O | | | | | | | | |
| Polymer P | | | | | | | | |
| Tinuvin ™ 350 | | 0.25 | | | 0.25 | | | 0.25 |
| Cyasorb ™ 5411 | | | 0.25 | | | 0.25 | | |
| H3PO3 | | | | 0.001613 | 0.001613 | 0.001613 | | |
| PEPQ | | | | | | | | |
| ratio H3PO3/cat. | | | | 5 | 5 | 5 | | |

TABLE 11-continued

DPC Terpolymer and Interfacial Homopolymer

| | Work. Ex. number | | | | 39 | 40 | | |
| --- | --- | --- | --- | --- | --- | --- | --- | --- |
| | | | | | Comp. Ex. number | | | |
| | 46 | 47 | 48 | 49 | | | 50 | 51 |
| | | | | DPC Terpolymer | | | Interfacial | |
| Mw, PS | | | | | | | | |
| pellets | 61866 | 61866 | 61866 | 61866 | 61866 | 61866 | 65747 | 65747 |
| Compounded | 53655 | 54282 | 53365 | 60963 | 61714 | 61372 | 65282 | 65515 |
| Mw after STD molding | 52734 | 49296 | 50021 | 61108 | 60900 | 61140 | 64941 | 64680 |
| Mw loss (%) comp. | −13 | −12 | −14 | −1 | 0 | −1 | −1 | 0 |
| Mw loss (%) STD | −15 | −20 | −19 | −1 | −2 | −1 | −1 | −2 |
| UV retention (%) | | | | | | | | |
| after compounding | | 85 | 44 | | 96 | 95 | | |
| after molding | | 36 | 26 | | 94 | 93 | | 97 |

TABLE 12

DPC Terpolymer and Interfacial Homopolymer

| | Work. Ex. number | | | | | |
| --- | --- | --- | --- | --- | --- | --- |
| | Comp. Ex. number | | | | | |
| | 52 | 53 | 54 | 55 | 56 | 57 |
| | | | | DPC - Homopolymer | | |
| Polymer I | | | 5.00 | 5.00 | 4.75 | 4.75 |
| Polymer J | 100 | 99.75 | | | | |
| Polymer K | | | 95 | 95.00 | 95.00 | 95.00 |
| Polymer L | | | | | | |
| Polymer M | | | | | | |
| Polymer N | | | | | | |
| Polymer O | | | | | | |
| Polymer P | | | | | | |
| Tinuvin ™ 350 | | 0.25 | | | 0.25 | |
| Cyasorb ™ 5411 | | | | | | 0.25 |
| H3PO3 | | | | 0.000119 | 0.000119 | 0.000119 |
| PEPQ | | | | | | |
| ratio H3PO3/cat. | | | | 5 | 5 | 5 |
| Mw, PS | | | | | | |
| pellets | 61881 | 61881 | 58844 | 58844 | 58844 | 58844 |
| Compounded | 61705 | 61217 | 56919 | 57459 | 57490 | 57394 |
| Mw after STD molding | 60796 | 60941 | 56621 | 57169 | 56848 | 57644 |
| Mw loss (%) comp. | 0 | −1 | −3 | −2 | −2 | −2 |
| Mw loss (%) STD | −2 | −2 | −4 | −3 | −3 | −2 |
| UV retention (%) | | | | | | |
| after compounding | | | | | 93 | 92 |
| after molding | | 93 | | | 92 | 92 |

| | Work. Ex. number | | | | | |
| --- | --- | --- | --- | --- | --- | --- |
| | Comp. Ex. number | | | | | |
| | 58 | 59 | 60 | 61 | 62 | 63 |
| | | | | BMSC-Homopolymer | | |
| Polymer I | 5.00 | 5.00 | 4.75 | 4.75 | 4.75 | 4.75 |
| Polymer J | | | | | | |
| Polymer K | | | | | | |
| Polymer L | | | | | | |
| Polymer M | | | | | | |
| Polymer N | | | | | | |
| Polymer O | 95 | 95 | 95 | 95 | 95 | 95 |
| Polymer P | | | | | | |
| Tinuvin ™ 350 | | | | | 0.25 | 0.25 |
| Cyasorb ™ 5411 | | | 0.25 | 0.25 | | |
| H3PO3 | | 0.00047 | | 0.00047 | | 0.00047 |
| PEPQ | | | | | | |
| ratio H3PO3/cat. | | 5 | | 5 | | 5 |

TABLE 12-continued

| DPC Terpolymer and Interfacial Homopolymer |
|---|

| Mw, PS | | | | | | |
|---|---|---|---|---|---|---|
| pellets | 58941 | 58941 | 58941 | 58941 | 58941 | 58941 |
| Compounded | 56876 | 57811 | 56505 | 56547 | 58316 | 58166 |
| Mw after STD molding | 55405 | 58427 | 52195 | 54267 | 57776 | 57726 |
| Mw loss (%) comp. | −4 | −2 | −4 | −4 | −1 | −1 |
| Mw loss (%) STD | −6 | −1 | −11 | −8 | −2 | −2 |
| UV retention (%) | | | | | | |
| after compounding | | | 74 | 87 | 83 | 91 |
| after molding | | | 17 | 85 | 48 | 89 |

Discussion:

Terpolymer DPC-Based

Comparative example 47 and 48 show the Mw loss and UV retention loss due to the addition of UV absorber after compounding. This loss becomes worse after molding the compounded material. Example 39 and 40 show the need for the addition of $H_3PO_3$ to minimize the Mw loss and have a high UV retention.

Terpolymer BMSC-Based

Comparative examples 39, 40 and 45 show the Mw and UV retention loss of the BMSC based terpolymer due to the addition of UV absorber. The Mw and UV retention loss is minimized by adding $H_3PO_3$ as shown in working examples 34 through 38.

Examples 32 and 33 show that the addition of $H_3PO_3$ in a ratio $H_3PO_3$/used catalyst of 1.13 is less effective than the higher ratio's $H_3PO_3$/used catalyst of 5 and 10.

BPA Homopolymer Made via the Interfacial Process

Comparative example 51 shows that there is no need to stabilize the homopolymer made via the interfacial route. There is almost no Mw loss or UV retention loss measured.

BPA Homopolymer DPC Based

Comparative example 53 shows little Mw loss and UV retention loss due to the addition of UV absorber.

BPA Homopolymer BMSC Based

Comparative examples 60 and 62 show loss in Mw and UV retention due to the addition of UV absorber. Addition of $H_3PO_3$ as shown in comparative example 61 and 63 minimize the Mw and UV retention loss.

The invention claimed is:

1. A method of making polycarbonate, comprising the steps of:
   (a) forming polycarbonate by a melt transesterification method using an activated diaryl carbonate, and
   (b) compounding the polycarbonate with a phosphorus-containing compound that has an abstractable proton or hydrolyzable group, wherein the phosphorous-containing compound is compounded with the polycarbonate in an amount sufficient to result in an increase in the L* color value, thereby improving the color properties of the polycarbonate as compared to pellets formed from the same polycarbonate without addition of the phosphorus-containing compound.

2. The method of claim 1, wherein the phosphorus-containing compound is a compound having structure I or II:

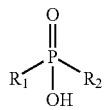

I wherein $R_1$ and $R_2$ are independently hydrogen; hydroxy, O—$(NH_4)$+; OH; linear, branched or cyclic $C_1$-$C_{36}$ alkyl or alkoxy; optionally substituted phenyl, aryl, phenoxy, or aryloxy,

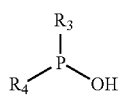

II wherein $R_3$ and $R_4$ are independently hydrogen; hydroxy, O—$(NH_4)$+; OH; linear, branched or cyclic $C_1$-$C_{36}$ alkyl or alkoxy; optionally substituted phenyl, aryl, phenoxy, or aryloxy.

3. The method of claim 2, wherein the phosphorus-containing compound is selected from the group consisting of: dimethyl phosphinic acid, dibutyl phosphinic acid, diphenyl phosphinic acid, 2-methylphenyl (phenyl) phosphinic acid, 3,5-dimethylphenyl (phenyl) phosphinic acid, 3-methoxyphenyl(phenyl)phosphinic acid, 4-methoxyphenyl(phenyl) phosphinic acid, 1-methylheptyl(phenyl)phosphinic acid, 4-ethoxyphenyl(phenyl)phosphinic acid, bis(4-methoxyphenyl)phosphinic acid, dioctylphosphinic acid, bis(2,4,4-trimethylpentyl)phosphinic acid, diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate, and di(2-ethylhexyl) phosphate, phosphorous acid, and mono-zinc phosphate $Zn(H_2PO_4)_2$.

4. The method of claim 1, wherein the phosphorus-containing compound comprises a compound having structure III or IV:

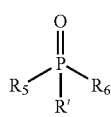

III wherein R' is an alkoxyl, phenoxy, aryloxy or aralkyloxy, $NR_x$ (where $R_x$ is H, alkyl, aryl or aralkyl), OC(=O)$R_x$ or OP(=O)R$_x$, and R$_5$ and R$_6$ are independently hydrogen, hydroxy; linear or cyclic C$_1$-C$_{36}$ alkyl or alkoxy; phenyl, aryl, phenoxy, or aryloxy phosphate ester or acid and phosphite ester or acid;

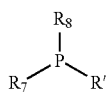

IV wherein R' is alkoxyl, phenoxy, aryloxy or aralkyloxy, NR$_x$ (where R$_x$ is H, alkyl, aryl or aralkyl), OC(=O)R$_x$ or OP(=O)R$_x$, and R$_7$ and R$_8$ are independently hydrogen, hydroxy; linear or cyclic C$_1$-C$_{36}$ alkyl or alkoxy; phenyl, aryl, phenoxy, or aryloxy, phosphate ester or acid, and phosphite ester or acid.

5. The method of claim 4, wherein the phosphorus-containing compound is selected from the group consisting of: distearyl pentaerythritol diphosphite, n-butyl diphenylphosphinite, 2-phenylethyl diphenylphosphinate, 1-naphthyl diphenylphosphinate, methyl diphenylphosphinite, ethyl diphenylphosphinite, n-butyl diphenylphosphinite, methylcyclohexyl diphenylphosphinate, triphenyl phosphite, diisodecyl phenyl phosphite, tri-para-tolyl phosphate, tri-n-propyl phosphate, methyl diphenyl phosphate, tri-n-butyl phosphate, triphenyl phosphate, cyclohexyl diphenyl phosphate, bis(3,5-dimethylphenyl) 4-ethylphenyl phosphate, tris(3,4-dimethylphenyl) phosphate, tris(4-tert-butylphenyl) phosphate, trans-1,4-cyclohexanediol bis(diphenyl phosphate), trisnonylphenyl phosphate, triisodecyl phosphite, tris(tridecyl) phosphate, and trilauryl phosphite.

6. The method of claim 4, wherein the phosphorus-containing compound is selected from the group consisting of: phosphorus pentoxide (P$_4$O$_{10}$), pyrophosphoric acid (H$_4$O$_7$P$_2$), magnesium pyrophosphate (H$_4$MgO$_7$P$_2$), dimethyl acid pyrophosphate (C$_2$H$_8$O$_7$P$_2$), diethyl acid pyrophosphate (C$_4$H$_{12}$O$_7$P$_2$), potassium pyrophosphate (H$_4$KO$_7$P$_2$), tetraethyl diphosphate (C$_8$H$_{20}$O$_7$P$_2$), propylphosphonic anhydride (C$_9$H$_{21}$O$_6$P$_3$), tris(N,N-tetramethylene)phosphoric acid triamide (C$_{12}$H$_{24}$N$_3$OP), methylphosphonic bis(dimethylamide) (C$_5$H$_{15}$N$_2$OP), N,N,N',N'-tetramethylphosphorodiamidic chloride (C$_4$H$_{12}$ClN$_2$OP), hexamethylphosphoramide (C$_6$H$_{18}$N$_3$OP), 1,3-dimethyl-1,2,3,4-tetrahydro-1,3,2-benzodiazaphosphorine-2,4-dione (C$_9$H$_{11}$N$_2$O$_2$P), diphenyl 1-piperidinylphosphonate (C$_{17}$H$_{20}$NO$_3$P), phenyl N,N,N',N'-tetramethyldiamidophosphate (C$_{10}$H$_{17}$N$_2$O$_2$P), and N,N,N',N'-tetramethyl-P-phenylphosphonic diamide (C$_{10}$H$_{17}$N$_2$OP).

7. The method of claim 1, wherein the activated diaryl carbonate is bismethylsalicylcarbonate.

8. The method of claim 7, wherein the phosphorus-containing compound is phosphorous acid.

9. The method of claim 7, wherein the polycarbonate is a terpolymer.

10. The method of claim 9, wherein the phosphorus-containing compound is phosphorous acid.

11. The method of claim 1, wherein the phosphorous-containing compound is compounded with the polycarbonate in an amount of at least 5 ppm.

12. The method of claim 1, wherein the phosphorous containing compound is compounded with the polycarbonate in an amount such that the molar ratio of phosphorous atoms to transesterification catalyst (P/cat) used in forming the polycarbonate is between 1 and 20.

13. A method for reducing the color of a polycarbonate made by transesterification using an activated diaryl-carbonate, said method comprising the steps of a compounding the phosphorus-containing compound that has an abstractable proton or hydrolyzable group, wherein the phosphorous-containing compound is compounded with the polycarbonate in an amount sufficient to result in an increase in the L* color value, thereby improving the color properties of the polycarbonate as compared to pellets formed from the same polycarbonate without addition of the phosphorus-containing compound.

14. The method of claim 13, wherein the polycarbonate before compounding with the phosphorus-containing compound has an L* value of less than 80, and after compounding has an L* value of greater than 80.

15. The method of claim 13, wherein the phosphorus-containing compound comprises a compound having structure I, II:

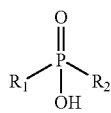

I wherein R$_1$ and R$_2$ are independently hydrogen; O—(NH$_4$)+; OH; linear, branched or cyclic C$_1$-C36 alkyl or alkoxy; optionally substituted phenyl, aryl, phenoxy, or aryloxy,

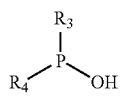

II wherein R$_3$ and R$_4$ are independently hydrogen; hydroxy; O—(NH$_4$)+; OH; linear, branched or cyclic C$_1$-C$_{36}$ alkyl or alkoxy; optionally substituted phenyl, aryl, phenoxy, or aryloxy.

16. The method of claim 13, wherein the phosphorus-containing compound is selected from the group consisting of: dimethyl phosphinic acid, dibutyl phosphinic acid, diphenyl phosphinic acid, 2-methylphenyl (phenyl) phosphinic acid, 3,5-dimethylphenyl (phenyl) phosphinic acid, 3-methoxyphenyl(phenyl)phosphinic acid, 4-methoxyphenyl(phenyl)phosphinic acid, 1-methylheptyl(phenyl)phosphinic acid, 4-ethoxyphenyl(phenyl)phosphinic acid, bis(4-methoxyphenyl)phosphinic acid, dioctylphosphinic acid, bis(2,4,4-trimethylpentyl)phosphinic acid, diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate, and di(2-ethylhexyl) phosphate, phosphorous acid, and mono-zinc phosphate Zn(H$_2$PO$_4$)$_2$.

17. The method of claim 13, wherein the phosphorus-containing compound comprises a compound having structure III or IV:

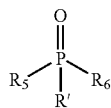

III wherein R' is an alkoxyl, phenoxy, aryloxy or aralkyloxy, NR$_x$ (where R$_x$ is H, alkyl, aryl or aralkyl), OC(=O)R$_x$ or OP(=O)R$_x$, and R$_5$ and R$_6$ are independently hydrogen, hydroxy; linear or cyclic C$_1$-C$_{36}$ alkyl or alkoxy; phenyl, aryl, phenoxy, or aryloxy phosphate ester or acid and phosphite ester or acid;

IV wherein R' is alkoxyl, phenoxy, aryloxy or aralkyloxy, NR$_x$ (where R$_x$ is H, alkyl, aryl or aralkyl), OC(=O)R$_x$ or OP(=O)R$_x$, and R$_7$ and R$_8$ are independently hydrogen, hydroxy; linear or cyclic C$_1$-C$_{36}$ alkyl or alkoxy; phenyl, aryl, phenoxy, or aryloxy, phosphate ester or acid, and phosphite ester or acid.

18. The method of claim 17, wherein the phosphorus-containing compound is selected from the group consisting of: distearyl pentaerythritol diphosphite, n-butyl diphenylphosphinite, 2-phenylethyl diphenylphosphinate, 1-naphthyl diphenylphosphinate, methyl diphenylphosphinite, ethyl diphenylphosphinite, n-butyl diphenylphosphinite, methylcyclohexyl diphenylphosphinate, triphenyl phosphite, diisodecyl phenyl phosphite, tri-para-tolyl phosphate, tri-n-propyl phosphate, methyl diphenyl phosphate, tri-n-butyl phosphate, triphenyl phosphate, cyclohexyl diphenyl phosphate, bis(3,5-dimethylphenyl) 4-ethylphenyl phosphate, tris(3,4-dimethylphenyl) phosphate, tris(4-tert-butylphenyl) phosphate, trans-1,4-cyclohexanediol bis(diphenyl phosphate), trisnonylphenyl phosphate, triisodecyl phosphite, tris(tridecyl) phosphate, and trilauryl phosphite.

19. The method of claim 17, wherein the phosphorus-containing compound is selected from the group consisting of: phosphorus pentoxide (P$_4$O$_{10}$), pyrophosphoric acid (H$_4$O$_7$P$_2$), magnesium pyrophosphate (H$_4$MgO$_7$P$_2$), dimethyl acid pyrophosphate (C$_2$H$_8$O$_7$P$_2$), diethyl acid pyrophosphate (C$_4$H$_{12}$O$_7$P$_2$), potassium pyrophosphate (H$_4$KO$_7$P$_2$), tetraethyl diphosphate (C$_8$H$_{20}$O$_7$P$_2$), propylphosphonic anhydride (C$_9$H$_{21}$O$_6$P$_3$), tris(N,N-tetramethylene)phosphoric acid triamide (C$_{12}$H$_{24}$N$_3$OP), methylphosphonic bis(dimethylamide) (C$_5$H$_{15}$N$_2$OP), N,N,N',N'-tetramethylphosphorodiamidic chloride (C$_4$H$_{12}$ClN$_2$OP), hexamethylphosphoramide (C$_6$H$_{18}$N$_3$OP), 1,3-dimethyl-1,2,3,4-tetrahydro-1,3,2-benzodiazaphosphorine-2,4-dione (C$_9$H$_{11}$N$_2$O$_2$P), diphenyl 1-piperidinylphosphonate (C$_{17}$H$_{20}$NO$_3$P), phenyl N,N,N',N'-tetramethyldiamidophosphate (C$_{10}$H$_{17}$N$_2$O$_2$P), and N,N,N',N'-tetramethyl-P-phenylphosphonic diamide (C$_{10}$H$_{17}$N$_2$OP).

20. The method of claim 13, further comprising the step of:
(c) forming polycarbonate pellets from the polycarbonate compounded with a phosphorus-containing compound.

21. A polycarbonate composition, characterized in that the polycarbonate contains quinone residues, internal ester linkages derived form the activated diaryl carbonate and at least ppb levels of phosphorous, and an L* value of greater than 85.

22. A method of making a stabilized polycarbonate blend, comprising the steps of:
(a) forming polycarbonate by a melt transesterification method using a diaryl carbonate and a quinone-type monomer, and
(b) compounding the polycarbonate with a phosphorus-containing compound and a UV stabilizer having a free —OH group, thereby forming a blend, wherein the phosphorus-containing compound has an abstractable proton or hydrolyzable group, and wherein the phosphorous-containing compound is compounded with the UV stabilizer and the polycarbonate in an amount sufficient to result in an increase in the retention of UV stabilizer in the blend and an increase the retention of molecular weight of the polycarbonate in the blend during a molding step, thereby improving the melt stability properties of the blend as compared to a blend formed from the same polycarbonate and UV stabilizer without the addition of the phosphorus-containing compound during a similar molding step.

23. The method of claim 22, wherein the phosphorus-containing compound is a compound having structure I or II:

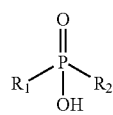

I wherein R$_1$ and R$_2$ are independently hydrogen; hydroxy, O—(NH$_4$)+; OH; linear, branched or cyclic C$_1$-C$_{36}$ alkyl or alkoxy; optionally substituted phenyl, aryl, phenoxy, or aryloxy,

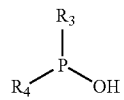

II wherein R$_3$ and R$_4$ are independently hydrogen; hydroxy, O—(NH$_4$)+; OH; linear, branched or cyclic C$_1$-C$_{36}$ alkyl or alkoxy; optionally substituted phenyl, aryl, phenoxy, or aryloxy.

24. The method of claim 23, wherein the phosphorus-containing compound is selected from the group consisting of: dimethyl phosphinic acid, dibutyl phosphinic acid, diphenyl phosphinic acid, 2-methylphenyl (phenyl) phosphinic acid, 3,5-dimethylphenyl (phenyl) phosphinic acid, 3-methoxyphenyl(phenyl)phosphinic acid, 4-methoxyphenyl(phenyl)phosphinic acid, 1-methylheptyl(phenyl)phosphinic acid, 4-ethoxyphenyl(phenyl)phosphinic acid, bis(4-methoxyphenyl)phosphinic acid, dioctylphosphinic acid, bis(2,4,4-trimethylpentyl)phosphinic acid, diammonium hydrogen phosphate, diphenyl phosphate, diphenyl phosphite, 4-(tert-pentyl)phenyl phosphate, (R)-(–)-1,1-binaphthalene-2,2'-diyl hydrogen phosphate, and di(2-ethylhexyl) phosphate, phosphorous acid, and mono-zinc phosphate Zn(H$_2$PO$_4$)$_2$.

25. The method of claim 22, wherein the phosphorus-containing compound comprises a compound having structure III or IV:

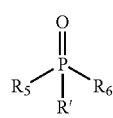

III wherein R' is an alkoxyl, phenoxy, aryloxy or aralkyloxy, NR$_x$ (where R$_x$ is H, alkyl, aryl or aralkyl), OC(=O)R$_x$ or OP(=O)R$_x$, and R$_5$ and R$_6$ are independently hydrogen, hydroxy; linear or cyclic $C_1$-$C_{36}$ alkyl or alkoxy; phenyl, aryl, phenoxy, or aryloxy phosphate ester or acid and phosphite ester or acid;

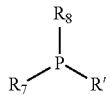

IV wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; linear or cyclic $C_1$-$C_{36}$ alkyl or alkoxy; phenyl, aryl, phenoxy, or aryloxy, phosphate ester or acid, and phosphite ester or acid.

26. The method of claim 25, wherein the phosphorus-containing compound is selected from the group consisting of: distearyl pentaerythritol diphosphate, n-butyl diphenylphosphinite, 2-phenylethyl diphenylphosphinate, 1-naphthyl diphenylphosphinate, methyl diphenylphosphinite, ethyl diphenylphosphinite, n-butyl diphenylphosphinite, methylcyclohexyl diphenylphosphinate, triphenyl phosphite, diisodecyl phenyl phosphite, tri-para-tolyl phosphate, tri-n-propyl phosphate, methyl diphenyl phosphate, tri-n-butyl phosphate, triphenyl phosphate, cyclohexyl diphenyl phosphate, bis(3,5-dimethylphenyl) 4-ethylphenyl phosphate, tris(3,4-dimethylphenyl) phosphate, tris(4-tert-butylphenyl) phosphate, trans-1,4-cyclohexanediol bis(diphenyl phosphate), trisnonylphenyl phosphate, triisodecyl phosphite, tris(tridecyl) phosphate, and trilauryl phosphite.

27. The method of claim 25, wherein the phosphorus-containing compound is selected from the group consisting of: phosphorus pentoxide ($P_4O_{10}$), pyrophosphoric acid ($H_4O_7P_2$), magnesium pyrophosphate ($H_4MgO_7P_2$), dimethyl acid pyrophosphate ($C_2H_8O_7P_2$), diethyl acid pyrophosphate ($C_4H_{12}O_7P_2$), potassium pyrophosphate ($H_4KO_7P_2$), tetraethyl diphosphate ($C_8H_{20}O_7P_2$), propylphosphonic anhydride ($C_9H_{21}O_6P_3$), tris(N,N-tetramethylene)phosphoric acid triamide ($C_{12}H_{24}N_3OP$), methylphosphonic bis(dimethylamide) ($C_5H_{15}N_2OP$), N,N,N',N'-tetramethylphosphorodiamidic chloride ($C_4H_{12}ClN_2OP$), hexamethylphosphoramide ($C_6H_{18}N_3OP$), 1,3-dimethyl-1,2,3,4-tetrahydro-1,3,2-benzodiazaphosphorine-2,4-dione ($C_9H_{11}N_2O_2P$), diphenyl 1-piperidinylphosphonate ($C_{17}H_{20}NO_3P$), phenyl N,N,N',N'-tetramethyldiamidophosphate ($C_{10}H_{17}N_2O_2P$), and N,N,N',N'-tetramethyl-P-phenylphosphonic diamide ($C_{10}H_{17}N_2OP$).

28. The method of claim 22, wherein the diaryl carbonate is an activated diaryl carbonate and is bismethylsalicylcarbonate.

29. The method of claim 28, wherein the phosphorus-containing compound is phosphorous acid.

30. The method of claim 22, wherein the amount phosphorous-containing compound compounded with the polycarbonate and the UV stabilizer is in an amount to provide a molar ratio of phosphorus atoms to transesterification catalyst used in forming the polycarbonate (P/cat) of between 1:1 and 10:1.

31. The method of claim 30, wherein the molar ratio is between 5:1 and 10:1.

32. The method of claim 22, wherein the quinone-type monomer is selected from the group consisting of hydroquinone, methylhydroquinone, butylhydroquinone, and phenylhydroquinone.

33. A stabilized polycarbonate blend, comprising
(a) a melt polycarbonate comprising a residue from a quinone-type monomer,
(b) a UV stabilizer having a free —OH group, and
(c) a phosphorus-containing compound having an abstractable proton or hydrolyzable group, wherein the phosphorous-containing compound is present in the blend in an amount sufficient to result in an increase in the retention of UV stabilizer in the blend and an increase the retention of molecular weight of the polycarbonate in the blend during a molding step, thereby improving the melt stability properties of the blend as compared to a blend formed from the same polycarbonate and UV stabilizer without the addition of the phosphorus-containing compound during a similar molding step.

34. The blend of claim 33, wherein the phosphorus-containing compound is a compound having structure I or II:

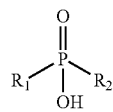

I wherein $R_1$ and $R_2$ are independently hydrogen; hydroxy, O—$(NH_4)$+; OH; linear, branched or cyclic $C_1$-$C_{36}$ alkyl or alkoxy; optionally substituted phenyl, aryl, phenoxy, or aryloxy,

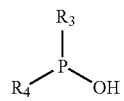

II wherein $R_3$ and $R_4$ are independently hydrogen; hydroxy, O—$(NH_4)$+; OH; linear, branched or cyclic $C_1$-$C_{36}$ alkyl or alkoxy; optionally substituted phenyl, aryl, phenoxy, or aryloxy.

35. The blend of claim 34, wherein the phosphorus-containing compound is selected from the group consisting of: dimethyl phosphinic acid, dibutyl phosphinic acid, diphenyl phosphinic acid, 2-methylphenyl (phenyl) phosphinic acid, 3,5-dimethylphenyl (phenyl) phosphinic acid, 3-methoxyphenyl(phenyl)phosphinic acid, 4-methoxyphenyl(phenyl) phosphinic acid, 1-methylheptyl(phenyl)phosphinic acid, 4-ethoxyphenyl(phenyl)phosphinic acid, bis(4-methoxyphenyl)phosphinic acid, dioctylphosphinic acid, bis(2,4,4-trimethylpentyl)phosphinic acid, diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate, and di(2-ethylhexyl) phosphate, phosphorous acid, and mono-zinc phosphate $Zn(H_2PO_4)_2$.

36. The blend of claim 33, wherein the phosphorus-containing compound comprises a compound having structure III or IV:

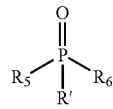

III wherein R' is an alkoxyl, phenoxy, aryloxy or aralkyloxy, $NR_x$ (where $R_x$ is H, alkyl, aryl or aralkyl), $OC(=O)R_x$ or $OP(=O)R_x$, and $R_5$ and $R_6$ are independently hydrogen, hydroxy; linear or cyclic $C_1$-$C_{36}$ alkyl or alkoxy; phenyl, aryl, phenoxy, or aryloxy phosphate ester or acid and phosphite ester or acid;

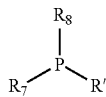

IV wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; linear or cyclic $C_1$-$C_{36}$ alkyl or alkoxy; phenyl, aryl, phenoxy, or aryloxy, phosphate ester or acid, and phosphite ester or acid.

37. The blend of claim 36, wherein the phosphorus-containing compound is selected from the group consisting of: distearyl pentaerythritol diphosphite, n-butyl diphenylphosphinite, 2-phenylethyl diphenylphosphinate, 1-naphthyl diphenylphosphinate, methyl diphenylphosphinite, ethyl diphenylphosphinite, n-butyl diphenylphosphinite, methylcyclohexyl diphenylphosphinate, triphenyl phosphite, diisodecyl phenyl phosphite, tri-para-tolyl phosphate, tri-n-propyl phosphate, methyl diphenyl phosphate, tri-n-butyl phosphate, triphenyl phosphate, cyclohexyl diphenyl phosphate, bis(3,5-dimethylphenyl) 4-ethylphenyl phosphate, tris(3,4-dimethylphenyl) phosphate, tris(4-tert-butylphenyl) phosphate, trans-1,4-cyclohexanediol bis(diphenyl phosphate), trisnonylphenyl phosphate, triisodecyl phosphite, tris(tridecyl) phosphate, and trilauryl phosphite.

38. The blend of claim 36, wherein the phosphorus-containing compound is selected from the group consisting of: phosphorus pentoxide ($P_4O_{10}$), pyrophosphoric acid ($H_4O_7P_2$), magnesium pyrophosphate ($H_4MgO_7P_2$), dimethyl acid pyrophosphate ($C_2H_8O_7P_2$), diethyl acid pyrophosphate ($C_4H_{12}O_7P_2$), potassium pyrophosphate ($H_4KO_7P_2$), tetraethyl diphosphate ($C_8H_{20}O_7P_2$), propylphosphonic anhydride ($C_9H_{21}O_6P_3$), tris(N,N-tetramethylene)phosphoric acid triamide ($C_{12}H_{24}N_3OP$), methylphosphonic bis(dimethylamide) ($C_5H_{15}N_2OP$), N,N,N',N'-tetramethylphosphorodiamidic chloride ($C_4H_{12}ClN_2OP$), hexamethylphosphoramide ($C_6H_{18}N_3OP$), 1,3-dimethyl-1,2,3,4-tetrahydro-1,3,2-benzodiazaphosphorine-2,4-dione ($C_9H_{11}N_2O_2P$), diphenyl 1-piperidinylphosphonate ($C_{17}H_{20}NO_3P$), phenyl N,N,N',N'-tetramethyldiamidophosphate ($C_{10}H_{17}N_2O_2P$), and N,N,N',N'-tetramethyl-P-phenylphosphonic diamide ($C_{10}H_{17}N_2OP$).

39. The blend of claim 38, wherein the phosphorus-containing compound is phosphorous acid.

40. The blend of claim 33, wherein the blend further comprises a transesterification catalyst and wherein the phosphorous-containing compound is present in the blend in an amount to provide a molar ratio of phosphorus atoms to transesterification catalyst (P/cat) of between 1:1 and 10:1.

41. The blend of claim 40, wherein the molar ratio is between 5:1 and 10:1.

42. The blend of claim 33, wherein the quinone-type monomer is selected from the group consisting of hydroquinone, methylhydroquinone, butylhydroquinone, and phenylhydroquinone.

43. A method of making a stabilized polycarbonate blend, comprising the steps of:
(a) forming polycarbonate by a melt transesterification method using a activated diaryl carbonate, and
(b) compounding the polycarbonate with a phosphorus-containing compound and a UV stabilizer having a free -OH group, thereby forming a blend,
wherein the phosphorus-containing compound has an abstractable proton or hydrolyzable group, and
wherein the phosphorous-containing compound is compounded with the UV stabilizer and the polycarbonate in an amount sufficient to result in an increase in the retention of UV stabilizer in the blend and an increase the retention of molecular weight of the polycarbonate in the blend during a molding step, thereby improving the melt stability properties of the blend as compared to a blend formed from the same polycarbonate and UV stabilizer without the addition of the phosphorus-containing compound during a similar molding step.

44. The method of claim 43, wherein the phosphorus-containing compound is a compound having structure I or II:

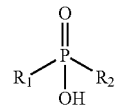

I wherein $R_1$ and $R_2$ are independently hydrogen; hydroxy, O—$(NH_4)$+; OH; linear, branched or cyclic $C_1$-$C_{36}$ alkyl or alkoxy; optionally substituted phenyl, aryl, phenoxy, or aryloxy,

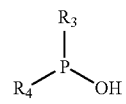

II wherein $R_3$ and $R_4$ are independently hydrogen; hydroxy, O—$(NH_4)$+; OH; linear, branched or cyclic $C_1$-$C_{36}$ alkyl or alkoxy; optionally substituted phenyl, aryl, phenoxy, or aryloxy.

45. The method of claim 44, wherein the phosphorus-containing compound is selected from the group consisting of: dimethyl phosphinic acid, dibutyl phosphinic acid, diphenyl phosphinic acid, 2-methylphenyl (phenyl) phosphinic acid, 3,5-dimethylphenyl (phenyl) phosphinic acid, 3-methoxyphenyl(phenyl)phosphinic acid, 4-methoxyphenyl(phenyl)phosphinic acid, 1-methylheptyl(phenyl)phosphinic acid, 4-ethoxyphenyl(phenyl)phosphinic acid, bis(4-methoxyphenyl)phosphinic acid, dioctylphosphinic acid, bis(2,4,4-trimethylpentyl)phosphinic acid, diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate, and di(2-ethylhexyl) phosphate, phosphorous acid, and mono-zinc phosphate $Zn(H_2PO_4)_2$.

46. The method of claim 43, wherein the phosphorus-containing compound comprises a compound having structure III or IV:

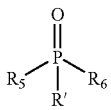

wherein R' is an alkoxyl, phenoxy, aryloxy or aralkyloxy, $NR_x$ (where $R_x$ is H, alkyl, aryl or aralkyl), $OC(=O)R_x$ or $OP(=O)R_x$, and $R_5$ and $R_6$ are independently hydrogen, hydroxy; linear or cyclic $C_1$-$C_{36}$ alkyl or alkoxy; phenyl, aryl, phenoxy, or aryloxy phosphate ester or acid and phosphite ester or acid;

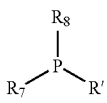

wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; linear or cyclic $C_1$-$C_{36}$ alkyl or alkoxy; phenyl, aryl, phenoxy, or aryloxy, phosphate ester or acid, and phosphite ester or acid.

47. The method of claim 46, wherein the phosphorus-containing compound is selected from the group consisting of: distearyl pentaerythritol diphosphite, n-butyl diphenylphosphinite, 2-phenylethyl diphenylphosphinate, 1-naphthyl diphenylphosphinate, methyl diphenylphosphinite, ethyl diphenylphosphinite, n-butyl diphenylphosphinite, methylcyclohexyl diphenylphosphinate, triphenyl phosphite, diisodecyl phenyl phosphite, tri-para-tolyl phosphate, tri-n-propyl phosphate, methyl diphenyl phosphate, tri-n-butyl phosphate, triphenyl phosphate, cyclohexyl diphenyl phosphate, bis(3,5-dimethylphenyl) 4-ethylphenyl phosphate, tris(3,4-dimethylphenyl) phosphate, tris(4-tert-butylphenyl) phosphate, trans-1,4-cyclohexanediol bis(diphenyl phosphate), trisnonylphenyl phosphate, triisodecyl phosphite, tris(tridecyl) phosphate, and trilauryl phosphite.

48. The method of claim 46, wherein the phosphorus-containing compound is selected from the group consisting of: phosphorus pentoxide ($P_4O_{10}$), pyrophosphoric acid ($H_4O_7P_2$), magnesium pyrophosphate ($H_4MgO_7P_2$), dimethyl acid pyrophosphate ($C_2H_8O_7P_2$), diethyl acid pyrophosphate ($C_4H_{12}O_7P_2$), potassium pyrophosphate ($H_4KO_7P_2$), tetraethyl diphosphate ($C_8H_{20}O_7P_2$), propylphosphonic anhydride ($C_9H_{21}O_6P_3$), tris(N,N-tetramethylene)phosphoric acid triamide ($C_{12}H_{24}N_3OP$), methylphosphonic bis(dimethylamide) ($C_5H_{15}N_2OP$), N,N,N',N'-tetramethylphosphorodiamidic chloride ($C_4H_{12}ClN_2OP$), hexamethylphosphoramide ($C_6H_{18}N_3OP$), 1,3-dimethyl-1,2,3,4-tetrahydro-1,3,2-benzodiazaphosphorine-2,4-dione ($C_9H_{11}N_2O_2P$), diphenyl 1-piperidinylphosphonate ($C_{17}H_{20}NO_3P$), phenyl N,N,N',N'-tetramethyldiamidophosphate ($C_{10}H_{17}N_2O_2P$), and N,N,N',N'-tetramethyl-P phenylphosphonic diamide ($C_{10}H_{17}N_2OP$).

49. The method of claim 43, wherein the diaryl carbonate is an activated diaryl carbonate and is bismethylsalicylcarbonate.

50. The method of claim 49, wherein the phosphorus-containing compound is phosphorous acid.

51. The method of claim 43, wherein the amount phosphorous-containing compound compounded with the polycarbonate and the UV stabilizer is in an amount to provide a molar ratio of phosphorus atoms to transesterification catalyst used in forming the polycarbonate (P/cat) of between 1:1 and 10:1.

52. The method of claim 51, wherein the molar ratio is between 5:1 and 10:1.

53. A stabilized polycarbonate blend, comprising
 (a) a melt polycarbonate comprising a residue from an activated diaryl carbonate,
 (b) a UV stabilizer having a free -OH group, and
 (c) a phosphorus-containing compound having an abstractable proton or hydrolyzable group,
 wherein the phosphorous-containing compound is present in the blend in an amount sufficient to result in an increase in the retention of UV stabilizer in the blend and an increase the retention of molecular weight of the polycarbonate in the blend during a molding step, thereby improving the melt stability properties of the blend as compared to a blend formed from the same polycarbonate and UV stabilizer without the addition of the phosphorus-containing compound during a similar molding step.

54. The blend of claim 53, wherein the phosphorus-containing compound is a compound having structure I or II:

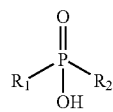

wherein $R_1$ and $R_2$ are independently hydrogen; hydroxy, O—$(NH_4)+$; OH; linear, branched or cyclic $C_1$-$C_{36}$ alkyl or alkoxy; optionally substituted phenyl, aryl, phenoxy, or aryloxy,

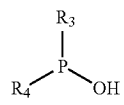

wherein $R_3$ and $R_4$ are independently hydrogen; hydroxy, O—$(NH_4)+$; OH; linear, branched or cyclic $C_1$-$C_{36}$ alkyl or alkoxy; optionally substituted phenyl, aryl, phenoxy, or aryloxy.

55. The blend of claim 54, wherein the phosphorus-containing compound is selected from the group consisting of: dimethyl phosphinic acid, dibutyl phosphinic acid, diphenyl phosphinic acid, 2-methylphenyl (phenyl) phosphinic acid, 3,5-dimethylphenyl (phenyl) phosphinic acid, 3-methoxyphenyl(phenyl)phosphinic acid, 4-methoxyphenyl(phenyl) phosphinic acid, 1-methylheptyl(phenyl)phosphinic acid, 4-ethoxyphenyl(phenyl)phosphinic acid, bis(4-methoxyphenyl)phosphinic acid, dioctylphosphinic acid, bis(2,4,4-trimethylpentyl)phosphinic acid, diammonium hydrogen phosphate, diphenyl phosphate, diphenyl phosphite, 4-(tert-pentyl)phenyl phosphate, (R)-(−)-1,1'-binaphthalene-2,2'-diyl hydrogen phosphate, and di(2-ethylhexyl) phosphate, phosphorous acid, and mono-zinc phosphate $Zn(H_2PO_4)_2$.

56. The blend of claim 53, wherein the phosphorus-containing compound comprises a compound having structure III or IV:

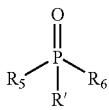

III wherein R' is an alkoxyl, phenoxy, aryloxy or aralkyloxy, $NR_x$, (where $R_x$ is H, alkyl, aryl or aralkyl), $OC(=O)R_x$ or $OP(=O)R_x$, and $R_5$ and $R_6$ are independently hydrogen, hydroxy; linear or cyclic $C_1$-$C_{36}$ alkyl or alkoxy; phenyl, aryl, phenoxy, or aryloxy phosphate ester or acid and phosphite ester or acid;

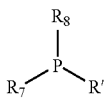

IV wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; linear or cyclic $C_1$-$C_{36}$ alkyl or alkoxy; phenyl, aryl, phenoxy, or aryloxy, phosphate ester or acid, and phosphite ester or acid.

57. The blend of claim 56, wherein the phosphorus-containing compound is selected from the group consisting of: distearyl pentaerythritol diphosphite, n-butyl diphenylphosphinite, 2-phenylethyl diphenylphosphinate, 1-naphthyl diphenylphosphinate, methyl diphenylphosphinite, ethyl diphenylphosphinite, n-butyl diphenylphosphinite, methylcyclohexyl diphenylphosphinate, triphenyl phosphite, diisodecyl phenyl phosphite, tri-para-tolyl phosphate, tri-n-propyl phosphate, methyl diphenyl phosphate, tri-n-butyl phosphate triphenyl phosphate, cyclohexyl diphenyl phosphate, bis(3,5-dimethylphenyl) 4-ethylphenyl phosphate, tris(3,4-dimethylphenyl) phosphate, tris(4-tert-butylphenyl) phosphate, trans-1,4-cyclohexanediol bis(diphenyl phosphate), tris-nonylphenyl phosphate, triisodecyl phosphite, tris(tridecyl) phosphate, and trilauryl phosphite.

58. The blend of claim 56, wherein the phosphorus-containing compound is selected from the group consisting of: phosphorus pentoxide ($P_4O_{10}$), pyrophosphoric acid ($H_4O_7P_2$), magnesium pyrophosphate ($H_4MgO_7P_2$,) dimethyl acid pyrophosphate ($C_2H_8O_7P_2$,) diethyl acid pyrophosphate ($C_4H_{12}O_7P_2$), potassium pyrophosphate ($H_4KO_7P_2$), tetraethyl diphosphate ($C_8H_{20}O_7P_2$, propylphosphonic anhydride ($C_9H_{21}O_6P_3$), tris(N,N-tetramethylene) phosphoric acid triamide (C12H24N3OP), methylphosphonic bis(dimethylamide) ($C_5H_{15}N_2OP$) N,N,N',N'-tetramethylphosphorodiamidic chloride ($C_4H_{12}ClN_2OP$) hexamethylphosphoramide ($C_6H_{18}N_3OP$), 1,3-dimethyl-1,2,3,4-tetrahydro-1,3,2-benzodiazaphosphorine-2,4-dione ($C_9H_{11}N_2O_2$) diphenyl 1-piperidinylphosphonate ($C_{17}H_{20}NO_3P$), phenyl N,N,N',N'-tetramethyldiamidophosphate ($C_{10}H_{17}N_2O_2P$), and N,N,N',N'-tetramethyl-P-phenylphosphonic diamide ($C_{10}H_{17}N_2O_2P$).

59. The blend of claim 53, wherein the phosphorus-containing compound is phosphorous acid.

60. The blend of claim 53, wherein the blend further comprises a transesterification catalyst and wherein the phosphorous-containing compound is present in the blend in an amount to provide a molar ratio of phosphorus atoms to transesterification catalyst (P/cat) of between 1:1 and 10:1.

61. The blend of claim 60, wherein the molar ratio is between 5:1 and 10:1.

* * * * *

UNITED STATES PATENT AND TRADEMARK OFFICE
CERTIFICATE OF CORRECTION

PATENT NO. : 7,645,851 B2
APPLICATION NO. : 11/688551
DATED : January 12, 2010
INVENTOR(S) : Berndsen et al.

It is certified that error appears in the above-identified patent and that said Letters Patent is hereby corrected as shown below:

Column 35, Claim 17, Lines 14 through 16 should read: -- wherein R' is alkoxyl, phenoxy, aryloxy or aralkyloxy, $NR_x$ (where $R_x$ is H, alkyl, aryl or aralkyl), $OC(=O)R_x$ or $OP(=O)R_x$, and $R_7$ and $R_8$ are independently hydrogen, hydroxy; --

Column 44, Claim 58, Lines 23 through 25 should read: -- ($C_{17}H_{20}NO_3P$), phenyl N,N,N',N'-tetramethyldiamidophosphate ($C_{10}H_{17}N_2O_2P$), and N,N,N',N'-tetramethyl-P-phenylphosphonic diamide ($C_{10}H_{17}N_2OP$). --

Signed and Sealed this

Sixteenth Day of March, 2010

David J. Kappos
*Director of the United States Patent and Trademark Office*